(12) United States Patent
Liu et al.

(10) Patent No.: US 11,178,629 B2
(45) Date of Patent: Nov. 16, 2021

(54) INFORMATION SENDING AND RECEIVING METHOD, NETWORK DEVICE, AND TERMINAL DEVICE

(71) Applicant: HUAWEI TECHNOLOGIES CO., LTD., Guangdong (CN)

(72) Inventors: Jin Liu, Shenzhen (CN); Pu Yuan, Shanghai (CN); Jun Luo, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 52 days.

(21) Appl. No.: 16/674,849

(22) Filed: Nov. 5, 2019

(65) Prior Publication Data

US 2020/0068514 A1 Feb. 27, 2020

Related U.S. Application Data

(63) Continuation of application No. PCT/CN2018/085499, filed on May 3, 2018.

(30) Foreign Application Priority Data

May 5, 2017 (CN) .......................... 201710313281.X

(51) Int. Cl.
*H04W 56/00* (2009.01)
*H04W 72/00* (2009.01)
*H04W 72/04* (2009.01)

(52) U.S. Cl.
CPC ....... *H04W 56/001* (2013.01); *H04W 72/005* (2013.01); *H04W 72/044* (2013.01)

(58) Field of Classification Search
CPC ............. H04W 56/001; H04W 72/005; H04W 72/044; H04W 72/042; H04W 28/065;
(Continued)

(56) References Cited

U.S. PATENT DOCUMENTS

2014/0242995 A1  8/2014  Lee et al.
2015/0208286 A1  7/2015  Ozturk et al.
(Continued)

FOREIGN PATENT DOCUMENTS

CN   101932091 A   12/2010
CN   102474386 A   5/2012
(Continued)

OTHER PUBLICATIONS

Ericsson, SS burst set composition and SS time index indication, 3GPP TSG-RAN WG1 Meeting #88, R1-1702120, Athens, Greece, Feb. 13-17, 2017, 4 pages.
(Continued)

*Primary Examiner* — Chi H Pham
*Assistant Examiner* — Vladislav Y Agureyev
(74) *Attorney, Agent, or Firm* — Fish & Richardson P.C.

(57) ABSTRACT

This application provides an information sending and receiving method, a network device, and a terminal device, to send, on a PBCH, information used to determine an SSB, to implement time sequence alignment with a cell radio frame. The method includes: generating, by a network device, first information and second information at a first protocol layer, where the first information includes system information, the second information is used to determine a time-frequency resource corresponding to one or more synchronization signal blocks SSBs, and the first protocol layer is a protocol layer higher than a physical layer; transmitting, the first information and the second information from the first protocol layer to the physical layer; performing, physical layer processing on the first information and the second information; and sending, by the network device by using a physical broadcast channel PBCH in the SSB, data obtained based on the physical layer processing.

20 Claims, 9 Drawing Sheets

(58) Field of Classification Search
CPC . H04L 1/00; H04L 1/0027; H04L 5/00; H04L 5/0048; H04L 29/06; H04L 69/06
See application file for complete search history.

(56) References Cited

U.S. PATENT DOCUMENTS

| | | | |
|---|---|---|---|
| 2015/0365264 | A1 | 12/2015 | Srinivasa et al. |
| 2016/0007260 | A1* | 1/2016 | Abraham ........ H04W 36/00837 370/331 |
| 2016/0128011 | A1 | 5/2016 | Yang et al. |
| 2016/0198382 | A1* | 7/2016 | Jung ..................... H04W 48/16 370/331 |
| 2016/0261327 | A1 | 9/2016 | Merlin et al. |
| 2016/0353433 | A1 | 12/2016 | Chulroh et al. |
| 2018/0167946 | A1* | 6/2018 | Si ............................. H04L 5/00 |
| 2018/0234931 | A1* | 8/2018 | Ly ......................... H04L 5/0053 |
| 2018/0248642 | A1* | 8/2018 | Si ........................... H04L 5/0092 |
| 2018/0270814 | A1* | 9/2018 | Wilson .................. H04W 72/06 |
| 2018/0324022 | A1* | 11/2018 | Sheng ............... H04W 36/0061 |
| 2019/0044639 | A1* | 2/2019 | Ouchi ..................... H04L 5/001 |
| 2019/0110275 | A1* | 4/2019 | Hapsari ................. H04W 88/08 |
| 2020/0076559 | A1* | 3/2020 | Yoshimura .............. H04L 5/001 |
| 2020/0187159 | A1* | 6/2020 | Ko ...................... H04W 72/005 |
| 2020/0245200 | A1* | 7/2020 | Xiong ................. H04B 7/0695 |
| 2020/0296673 | A1* | 9/2020 | Ouchi ................. H04W 52/325 |
| 2020/0404617 | A1* | 12/2020 | Murray ................. H04W 68/02 |

FOREIGN PATENT DOCUMENTS

| | | |
|---|---|---|
| CN | 102594373 A | 7/2012 |
| CN | 103875286 A | 6/2014 |
| CN | 105917699 A | 8/2016 |

OTHER PUBLICATIONS

Cohere Technologies, "NR SS Burst Composition and SS Time Index Indication," 3GPP TSG-RAN Meeting #88, R1-1702374, Athens, Greece, Feb. 13-17, 2017, 6 pages.

Huawei, Hisilicon, "NR Primary and Secondary Synchronization Signals Design," 3GPP TSG RAN WG1 Meeting #87, R1-1611261, Reno USA, Nov. 14-18, 2016, 10 pages.

Samsung, "SS burst set composition and time index indication," 3GPP TSG RAN WG1 #88, R1-1702901, Athens, Greece, Feb. 13-17, 2017, 6 pages.

Extended European Search Report issued in European Application No. 18794386.5 date Apr. 6, 2020, 9 pages.

Office Action issued in Chinese Application No. 201710313281.X dated Feb. 19, 2020, 27 pages (with English translation).

Huawei et al., "Discussion and evaluation on broadcast channel/signals transmission for beam based initial access," 3GPP TSG RAN WG1 Meeting #88bis, R1-1705057, Spokane, USA, Apr. 3-7, 2017, 5 pages.

InterDigital Communications, "On Synchronization Signal Block and Indication," 3GPP TSG RAN WG1 Meeting #88bis, R1-1705498, Spokane, USA, Apr. 3-7, 2017, 5 pages.

Office Action issued in Japanese Application No. 2019-560651 dated Dec. 1, 2020, 19 pages (with English translation).

Qualcomm Incorporated, "PBCH channel coding," 3GPP TSG RAN WG1 Meeting #88bis, R1-1705638, Spokane USA Apr. 3-7, 2017, 4 pages.

Qualcomm Incorporated, "SS burst composition and time index indication considerations," 3GPP TSG-RAN WG1 NR #88, R1-1702585, Athens, Greece, Feb. 13-17, 2017, 6 pages.

Office Action issued in Indian Application No. 201937049891 dated Mar. 18, 2021, 5 pages.

* cited by examiner

INFORMATION SENDING AND RECEIVING METHOD, NETWORK DEVICE, AND TERMINAL DEVICE

CROSS-REFERENCE TO RELATED APPLICATIONS

This application is a continuation of International Application No. PCT/CN2018/085499, filed on May 3, 2018, which claims priority to Chinese Patent Application No. 201710313281.X, filed on May 5, 2017, The disclosures of the aforementioned applications are hereby incorporated by reference in their entireties.

TECHNICAL FIELD

This application relates to the communications field, and more specifically, to an information sending and receiving method, a network device, and a terminal device.

BACKGROUND

In a new radio access technology (New Radio Access Technology, NR) system, synchronization signal blocks (Synchronization Signal Block, SSB) are introduced because a plurality of beams are considered. There is a configurable mapping relationship between a beam and an SSB. For example, in a plurality of beams, a different SSB is sent in each beam, or a same SSB may be sent in two beams. Each SSB may include an NR-primary synchronization signal (NR-Primary Synchronization Signal, NR-PSS), an NR-secondary synchronization signal (NR-Secondary Synchronization Signal, NR-SSS), and a physical broadcast channel (Physical Broadcast Channel, PBCH). A network device may periodically send one or more SSBs by using one or more radio frames as a period, and the one or more SSBs sent in one period may constitute one SS burst set (SS burst set).

Considering the foregoing manner of sending an SSB, some additional information needs to be carried in the SSB, to implement detection of the SSB by a terminal device or implement more functions. For example, a relative location, of each SSB, in an SS burst set to which the SSB belongs is fixed, in other words, a time domain resource used by the network device to send each SSB is relatively fixed. Therefore, the terminal device may deduce a frame boundary and a slot boundary of a cell based on the currently received SSB, to complete time sequence alignment with a cell radio frame. However, because one SS burst set may include a plurality of SSBs, the terminal device needs to know a relative location, of the received. SSB, in an SS burst set to which the SSB belongs, to complete time sequence alignment with a cell radio frame.

Therefore, how the network device indicates, to the terminal device, a relative location, of an SSB currently sent by the network device, in an SS burst set to which the SSB belongs becomes an urgent technical problem to be resolved.

SUMMARY

This application provides an information sending and receiving method, a network device, and a terminal device, to send, in an SSB to the terminal device, information used to determine a time-frequency resource, of the SSB, in an SS burst set to which the SSB belongs, to implement time sequence alignment with a cell radio frame.

According to a first aspect, an information sending method is provided. The method includes:

generating, by a network device, first information and second information at a first protocol layer, where the first information includes system information, the second information is used to determine a time-frequency resource corresponding to one or more synchronization signal blocks SSBs, and the first protocol layer is a protocol layer higher than a physical layer;

transmitting, by the network device, the first information and the second information from the first protocol layer to the physical layer;

performing, by the network device, physical layer processing on the first information and the second information; and sending, by the network device by using a physical broadcast channel PBCH in the SSB, data obtained after the physical layer processing.

In NR, to support a plurality of beams, a plurality of SSBs may be sent in each radio frame. When receiving an SSB, a terminal device does not know a relative location relationship between the SSB and each of a frame boundary and a slot boundary, and cannot deduce the frame boundary and the slot boundary. A relative location, of each SSB, in an SS burst set to which the SSB belongs is fixed, in other words, a time domain resource occupied by each SSB may be relatively fixed. Therefore, this embodiment of this application provides an information sending method, to add information used to determine a time-frequency resource of an SSB in the SSB and send the information to the terminal device, so that the terminal device determines the time-frequency resource, of the received SSB, in an SS burst set based on the information, and deduces a frame boundary and a cell boundary, to implement time sequence alignment with a cell radio frame.

In this embodiment of this application, the network device generates the first information and the second information at the first protocol layer, may process the first information and the second information in different data processing manners listed below, and at last, sends the first information and the second information to the terminal device by using the PBCH in the SSB.

Optionally, the transmitting, by the network device, the first information and the second information from the first protocol layer to the physical layer includes:

performing, by the network device at the first protocol layer, encapsulation processing on the first information and the second information that are used as a whole, to generate a first message; and mapping, by the network device, the first message to an intermediate channel between the first protocol layer and the physical layer and sending the first message to the physical layer, where the intermediate channel includes a same logical channel and a same transport channel.

Optionally, the transmitting, by the network device, the first information and the second information from the first protocol layer to the physical layer includes:

performing, by the network device at the first protocol layer, encapsulation processing on the first information, to generate a first message;

performing, by the network device at the first protocol layer, encapsulation processing on the second information, to generate a second message;

mapping, by the network device, the first message and the second message to an intermediate channel between the first protocol layer and the physical layer and sending the first message and the second message to the physical layer, where the intermediate channel includes a same logical channel and a same transport channel; or the intermediate channel includes different logical channels and a same transport channel.

Optionally, the transmitting, by the network device, the first information and the second information from the first protocol layer to the physical layer includes:

performing, by the network device at the first protocol layer, encapsulation processing on the first information, to generate a first message;

performing, by the network device at the first protocol layer, encapsulation processing on the second information, to generate a second message;

mapping, by the network device, the first message to a first intermediate channel between the first protocol layer and the physical layer and sending the first message to the physical layer; and mapping, by the network device, the second message to a second intermediate channel between the first protocol layer and the physical layer and sending the second message to the physical layer.

Optionally, the performing, by the network device, physical layer processing on the first information and the second information includes:

performing, by the network device at the physical layer, physical layer processing on the first message received by using the first intermediate channel and the second message received by using the second intermediate channel, where the first message and the second message are used as a whole.

Optionally, the performing, by the network device, physical layer processing on the first information and the second information includes:

performing, by the network device at the physical layer, physical layer processing on each of the first message received by using the first intermediate channel and the second message received by using the second intermediate channel.

According to a second aspect, an information receiving method is provided. The method includes:

receiving, by a terminal device on a physical broadcast channel PBCH, data sent by a network device;

performing, by the terminal device, physical layer processing on the received data at the physical layer;

transmitting, by the terminal device from the physical layer to the first protocol layer, the data on which the physical layer processing has been performed; and processing, by the terminal device at the first protocol layer, the data on which the physical layer processing has been performed, to obtain first information and second information, where the first information includes system information, and the second information is used to determine a time-frequency resource corresponding to one or more synchronization signal blocks SSBs that carry the data.

In NR, to support a plurality of beams, a plurality of SSBs may be sent in each radio frame. When receiving an SSB, a terminal device does not know a relative location relationship between the SSB and each of a frame boundary and a slot boundary, and cannot deduce the frame boundary and the slot boundary. A relative location, of each SSB, in an SS burst set to which the SSB belongs is fixed, in other words, a time domain resource occupied by each SSB may be relatively fixed. Therefore, this embodiment of this application provides an information receiving method, to add information used to determine a time-frequency resource of an SSB in the SSB and send the information to the terminal device, so that the terminal device determines the time-frequency resource, of the received SSB, in an SS burst set based on the information, and deduces a frame boundary and a cell boundary, to implement time sequence alignment with a cell radio frame.

In this embodiment of this application, the terminal device may process, in different data processing manners listed below, the data received on the PBCH, to obtain the first information and the second information from the first protocol layer.

Optionally, the transmitting, by the terminal device from the physical layer to the first protocol layer, the data on which the physical layer processing has been performed includes:

mapping, by the terminal device to an intermediate channel between the first protocol layer and the physical layer, the data on which the physical layer processing has been performed, and sending the data to the first protocol layer; and the processing, by the terminal device at the first protocol layer, the data on which the physical layer processing has been performed, to obtain first information and second information includes: performing, by the terminal device at the first protocol layer, decapsulation processing on the data received by using the intermediate channel, to obtain an entirety formed by combining the first information and the second information; and obtaining the first information and the second information from the entirety formed by combining the first information and the second information, where the intermediate channel includes a same logical channel and a same transport channel.

Optionally, the transmitting, by the terminal device from the physical layer to the first protocol layer, the data on which the physical layer processing has been performed includes:

mapping, by the terminal device to an intermediate channel between the first protocol layer and the physical layer, the data on which the physical layer processing has been performed, and sending the data to the first protocol layer; and the processing, by the terminal device at the first protocol layer, the data on which the physical layer processing has been performed, to obtain first information and second information includes:

performing, by the terminal device at the first protocol layer, decapsulation processing on the data received by using the intermediate channel, to obtain the first information and the second information, where the intermediate channel includes a same logical channel and a same transport channel, or the intermediate channel includes different logical channels and a same transport channel.

Optionally, the performing, by the terminal device, physical layer processing on the received data at the physical layer includes:

performing, by the terminal device, physical layer processing on the received data at the physical layer, to obtain first data and second data on which the physical layer processing has been performed;

the transmitting, by the terminal device from the physical layer to the first protocol layer, the data on which the physical layer processing has been performed includes:

mapping, by the terminal device to a first intermediate channel between the first protocol layer and the physical layer, the first data on which the physical layer processing has been performed; and sending the first data to the first protocol layer; and mapping, by the terminal device to a second intermediate channel between the first protocol layer and the physical layer, the second data on which the physical layer processing has been performed, and sending the second data to the first protocol layer; and the processing, by the terminal device at the first protocol layer, the data on which the physical layer processing has been performed, to obtain first information and second information includes:

performing, by the terminal device at the first protocol layer, decapsulation processing on the first data received by using the first intermediate channel, to obtain the first information; and performing, by the terminal device at the first protocol layer, decapsulation processing on the second data received by using the second intermediate channel, to obtain the second information.

Optionally, the data received by the terminal device includes third data and fourth data;

the performing, by the terminal device, physical layer processing on the received data at the physical layer includes:

performing, by the terminal device, physical layer processing on the third data at the physical layer, to obtain the third data on which the physical layer processing has been performed; and performing, by the terminal device, physical layer processing on the fourth data at the physical layer, to obtain the fourth data on which the physical layer processing has been performed;

the transmitting, by the terminal device from the physical layer to the first protocol layer, the data on which the physical layer processing has been performed includes:

mapping, by the terminal device to a first intermediate channel between the first protocol layer and the physical layer, the third data on which the physical layer processing has been performed, and sending the third data to the first protocol layer; and mapping, by the terminal device to a second intermediate channel between the first protocol layer and the physical layer, the fourth data on which the physical layer processing has been performed, and sending the fourth data to the first protocol layer; and the processing, by the terminal device at the first protocol layer, the data on which the physical layer processing has been performed, to obtain first information and second information includes:

performing, by the terminal device at the first protocol layer, decapsulation processing on the third data received by using the first intermediate channel, to obtain the first information; and performing, by the terminal device at the first protocol layer, decapsulation processing on the fourth data received by using the second intermediate channel, to obtain the second information.

According to a third aspect, a network device is provided. The network device includes units that are configured to perform the information sending method in any one of the first aspect or the possible implementations of the first aspect.

According to a fourth aspect, a terminal device is provided. The terminal device includes units that are configured to perform the information receiving method in any one of the second aspect or the possible implementations of the second aspect.

According to a fifth aspect, a network device is provided. The network device includes a transceiver, a processor, and a memory. The processor is configured to control the transceiver to receive and send a signal. The memory is configured to store a computer program. The processor is configured to invoke the computer program from the memory and run the computer program, so that the network device is enabled to perform the method in any one of the first aspect or the possible implementations of the first aspect.

According to a sixth aspect, a terminal device is provided. The terminal device includes a transceiver, a processor, and a memory. The processor is configured to control the transceiver to receive and send a signal. The memory is configured to store a computer program. The processor is configured to invoke the computer program from the memory and run the computer program, so that the terminal device is enabled to perform the method in any one of the second aspect or the possible implementations of the second aspect.

According to a seventh aspect, a computer program product is provided. The computer program product includes computer program code, and when the computer program code is run by a network device, the network device is enabled to perform the method in any one of the first aspect or the possible implementations of the first aspect.

According to an eighth aspect, a computer program product is provided. The computer program product includes computer program code, and when the computer program code is run by a terminal device, the terminal device is enabled to perform the method in any one of the second aspect or the possible implementations of the second aspect.

According to a ninth aspect, a computer-readable medium is provided. The computer-readable medium stores program code, and the program code includes an instruction used to perform the method in any one of the first aspect or the possible implementations of the first aspect.

According to a tenth aspect, a computer-readable medium is provided. The computer-readable medium stores program code, and the program code includes an instruction used to perform the method in any one of the second aspect or the possible implementations of the second aspect.

According to a tenth aspect, a chip system is provided. The chip system includes a processor, where the processor is configured to invoke a computer program from a memory and run the computer program, and the computer program is configured to implement the methods in the foregoing aspects.

Optionally, the first intermediate channel includes a first logical channel and/or a first transport channel, and the second intermediate channel includes a second logical channel and/or a second transport channel.

The logical channel is defined by a type of information carried in the logical channel, for example, may be classified into a control channel and a traffic channel. For example, in a long term evolution (Long Term Evolution, LTE) protocol, a logical channel is provided by a media access control (Media Access Control, MAC) layer to an upper layer for use.

The transport channel is defined by a transmission manner of a channel. In the LTE protocol, a transport channel is provided by a physical (Physical, PHY) layer to an upper layer for use.

It should be understood that the foregoing examples of specific content of the intermediate channel are merely examples for description, and should not constitute any limitation to the embodiments of the present invention. The embodiments of the present invention should not be limited thereto. For example, the physical layer and the first protocol layer may be adjacent protocol layers, and the intermediate channel may be a redefined channel that is configured to: implement functions of both the logical channel and the transport channel, and implement information exchange between the physical layer and the first protocol layer. Alternatively, more or fewer protocol layers may be included between the physical layer and the first protocol layer, and the intermediate channel may use the logical channel and the transport channel in LIT, or may use the logical channel, the transport channel, and another redefined channel, to implement information exchange between the protocol layers. This is not particularly limited in the embodiments of this application.

The second information includes:

a first time index TI of the first SSB in an SS burst set to which the first SSB belongs; or a combination of a second TI of the first SSB in an SS burst to which the first SSB belongs and a third TI of the SS burst in an SS burst set to which the SS burst belongs.

Optionally, the system information includes one or more of the following: configuration information (used to indicate time-frequency resource information and a subcarrier spacing that are used to transmit remaining minimum system information) that includes a system bandwidth value, a system frame number SFN (System Frame Number), or remaining minimum system information (Remaining Minimum System Information, RMSI).

In this application, the information used to determine the time-frequency resource, of the SSB, in the SS burst set to which the SSB belongs is sent to the terminal device in the SSB, so that the terminal device can implement time sequence alignment with the cell radio frame based on the information.

DESCRIPTION OF EMBODIMENTS

The following describes the technical solutions in this application with reference to the accompanying drawings.

It should be understood that the technical solutions in this application may be applied to various communications systems, for example: a global system for mobile communications (Global System for Mobile communications, GSM), a code division multiple access (Code Division Multiple Access, CDMA) system, a wideband code division multiple access (Wideband Code Division Multiple Access, WCDMA) system, and a general packet radio service (General Packet Radio Service. GPRS) system, a long term evolution (LTE) system, a long term evolution advanced (LTE-A) system, a universal mobile telecommunications system (Universal Mobile Telecommunication Systems, UMTS), or a next-generation communications system (for example, a 5th generation (Fifth-Generation. 5G) system). The 5G system may also be referred to as a new radio access technology (NR) system.

Figure 1:
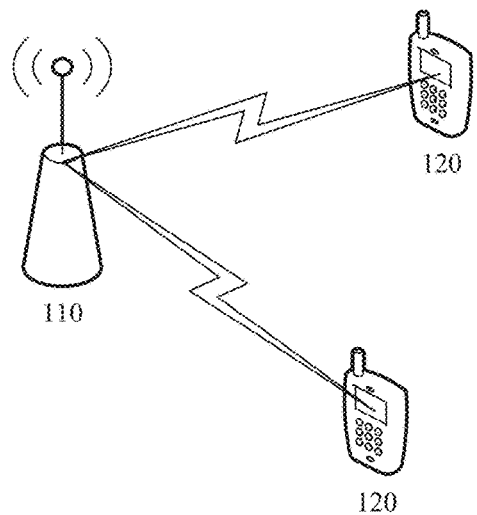
FIG. 1 is a schematic diagram of a communications system applicable to an information sending and receiving method in an embodiment of this application.

For ease of understanding of the embodiments of this application, a communications system applicable to the embodiments of this application is first briefly described with reference to FIG. 1. FIG. 1 is a schematic diagram of a communications system 100 applicable to an information sending and receiving method according to an embodiment of this application. As shown in FIG. 1, the communications system 100 includes at least two communications devices, for example, a network device 110 and a terminal device 120. Data communication may be performed between the network device 110 and the terminal device 120 by using a wireless connection.

It should be understood that the network device 110 may be a base transceiver station (Base Transceiver Station, BTS) in global mobile communication (GSM) or code division multiple access (CDMA), or may be a NodeB (NodeB, NB) in wideband code division multiple access (WCDMA), or may be an evolved NodeB (evolved Node B, eNB or eNodeB) in long term evolution (LIE), or may be a relay station, an access point, a remote radio unit (Remote Radio Unit, RRU), or may be a vehicle-mounted device or a wearable device, or may be a radio controller in a cloud radio access network (Cloud Radio Access Network, CRAN) scenario or a network side device in a future 5G system, such as a transmission point (Transmission Point, TP), a transmission reception point (Transmission reception point, TRP), a gNodeB (gNodeB, gNB), or a small cell device. This is not particularly limited in this embodiment of this application.

It should be further understood that the terminal device 120 may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (Station, ST) in a wireless local area network (Wireless local Area Network, WLAN), or may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device or computing device having a wireless communication function, another processing device connected to a wireless modem, a vehicle-mounted device, a wearable device, and a terminal device in a next-generation communications system, for example, a terminal device in a 5G network or a terminal device in a future evolved public land mobile network (Public Land Mobile network, PLMN) network. This is not particularly limited in the embodiments of this application.

It should be further understood that FIG. 1 is merely a simplified schematic diagram that is used as an example for ease of understanding. The communications system 100 may further include another network device and/or terminal device that is not drawn in FIG. 1.

Furthermore, in the embodiments of this application, the network device provides a service for a cell, and the terminal device communicates with the network device by using a transmission resource (for example, a frequency domain resource, namely, a spectrum resource) used by using the cell. The cell may be a cell corresponding to the network device (for example, a base station). The cell may belong to a macro base station or may belong to a base station corresponding to a small cell (Small cell). The small cell herein may include a metro cell (Metro cell), a micro cell (Micro cell), a pica cell (Pico cell), a femto cell (Feint® cell), and the like. These small cells are characterized by a small coverage area, low transmit power, and the like, and are suitable for providing a high-rate data transmission service. In addition, the cell may alternatively be a hypercell (Hypercell). The hypercell uses a user centric no cell radio access (User Centric No Cell Radio Access, UCNC) technology. To be specific, the terminal device no longer accesses a fixed physical site (for example, a TRP), but accesses a logical entity (Logical Entity, LE) including a group of TRPs, to obtain a service. The logical entity may be referred to as a hypercell. A boundary of the hypercell is flexible, and may vary with network load and user distribution. Because all of the TRPS in the hypercell are transparent to the terminal device, the terminal device is no longer connected to a fixed TRP, but only needs to access the hypercell based on a hypercell ID to obtain services from the TRPs in the hypercell.

Figure 2:
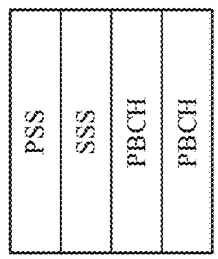
FIG. 2 is a schematic diagram of a possible SSB resource structure according to an embodiment of this application.

In NR, a plurality of SSBs are introduced because a plurality of beams are considered. FIG. 2 is a schematic diagram of a possible SSB resource structure according to an embodiment of this application. As shown in FIG. 2, one SSB may include an NR-PSS of one orthogonal frequency division multiplexing (Orthogonal Frequency Division Multiplexing, OFDM) symbol, an NR-SSS of one OFDM symbol, and an NR-PBCH of two OFDM symbols. As can be seen from the figure, the NR-PSS, the NR-SSS, and the NR-PBCH in each SSB occupy four consecutive OFDM symbols.

In this embodiment of this application, the NR-PSS and the NR-SSS may respectively have functions of a PSS and an SSS in the prior art (for example, LTE). For example, the NR-PSS may be configured to determine OFDM symbol timing, frequency synchronization, slot timing, and a cell ID within a cell group. The NR-SSS may be configured to determine frame timing, a cell group, or the like. Alternatively, the NR-PSS and the NR-SSS may have functions different from those of a current PSS and a current SSS. This is not limited in this embodiment of this application. In addition, the NR-PSS and the NR-SSS may alternatively use sequences that are respectively the same as or different from those of the current PSS and SSS. This is not limited in this embodiment of this application.

In addition, in this embodiment of this application, the NR-PBCH may have a function the same as or different from that of a. PBCH in the prior ark (for example, LTE). This is also not limited in this application. Optionally, the NR-PBCH may carry a master information block (Master Information Block, MIB).

It should be understood that the resource structure of the SSB shown in FIG. 2 is merely a possible structure, and should not constitute any limitation to this embodiment of this application. For example, quantities of subcarriers occupied in frequency domain by the NR-PSS, the NR-SSS, and the NR-PBCH may be different, and are not shown in the figure. Alternatively, the NR-PSS, the NR-SSS, and the NR-PBCH may not be temporally continuous. Alternatively, the SSB may include only the NR-PSS and the NR-PBCH, or include only the NR-SSS and the NR-PBCH, or even may include only the NR-PBCH. The resource structure of the SSB is not particularly limited in this embodiment of this application.

Figure 3:
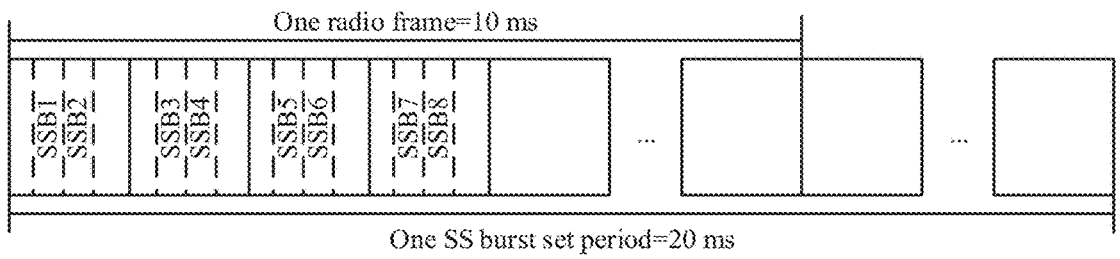
FIG. 3 is a schematic diagram of a possible SS burst set resource structure according to an embodiment of this application.

FIG. 3 is a schematic diagram of a possible SS burst set resource structure according to an embodiment of this application. One or more SSBs may constitute one SS burst, one or more SS bursts may constitute one SS burst set, and one SS burst set is mapped to one or more radio frames and is periodically sent. In other words, a sending period of one SS burst set includes one or more radio frames. For example, FIG. 3 shows a case in which a sending period of one SS burst set includes two radio frames. It can be learned from the figure that a plurality of SSBs in each SS burst set may be continuous or discontinuous in time domain. As shown in the figure, an SSB 1 and an SSB 2 are continuous in time domain, and an SSB 3 and an SSB 4 are continuous in time domain, but the SSB 2 and the SSB 3 are discontinuous in time domain. This is not particularly limited in this embodiment of this application. The SSB 1 and the SSB 2 may constitute an SS burst, and the SSB 3 and the SSB 4 may constitute an SS burst. The rest can be deduced by analogy.

In conclusion, it can be learned that there is a relatively great difference between distribution of the SSB in NR and distribution of the synchronization signal in LTE on a time domain resource. In LTE, in a specific duplex mode, relative locations, of the PSS and the SSS, in each radio frame may be fixed. For example, in a frequency division duplex (Frequency Division Duplex, FDD) mode, the PSS is transmitted on the last symbols (symbol) of the first slots (slot) of a zeroth subframe and a fifth subframe, and the SSS is transmitted at a location that is on the same symbol and that is closely adjacent to the last symbols. However, in a time division duplex (Time Division Duplex, TDD) mode, the PSS is transmitted on the third symbols of a first subframe and a sixth subframe, and the SSS is transmitted on the last symbols of a zeroth subframe and a fifth subframe. Although the terminal device does not know a duplex mode of a found cell, the terminal device may distinguish FDD from TDD based on a difference between the PSS and the SSS in a time sequence structure, and further complete slot synchronization and frame synchronization.

However, in NR, a plurality of SSBs may be sent in each radio frame. When receiving an SSB, the terminal device does not know a relative location relationship between the SSB and each of a frame boundary and a slot boundary, and cannot deduce the frame boundary and the slot boundary. A relative location, of each SSB, in an SS burst set to which the SSB belongs is fixed, in other words, a time domain resource occupied by each SSB may be relatively fixed. For example, the SSB 1 shown in FIG. 3 may be transmitted on the last symbol of the first slot of a first subcarrier of the first radio frame.

An embodiment of this application provides an information sending and receiving method. Additional information is carried in an SSB, and the additional information may be, for example, used to determine a sequence number (or referred to as a time index (Time Index) TI) of a rank of the SSB in a sending period of an SS burst set to which the SSB belongs. The TI not only can be used to determine the rank of the SSB in the sending period of the SS burst set to which the SSB belongs, but also can be used to determine time domain resource locations of SSBs having a same TI in sending periods of SS burst sets to which the SSBs respectively belong. It may be understood that any two SSBs having a same TI have a same time domain resource location in sending periods of SS burst sets to which the SSBs respectively belong. Therefore, after obtaining TIs in the one or more SSBs, the terminal device may, deduce a frame boundary and a slot boundary of a cell based on a time domain resource mapped by the SSB corresponding to the TI in a sending period of an SS burst set, to implement time sequence alignment with a cell radio frame.

However, how to add the additional information to the SSB and how the terminal device reads the additional information are still problems to be resolved.

The following describes in detail the information sending and receiving method in the embodiments of this application with reference to the accompanying drawings.

Figure 4:
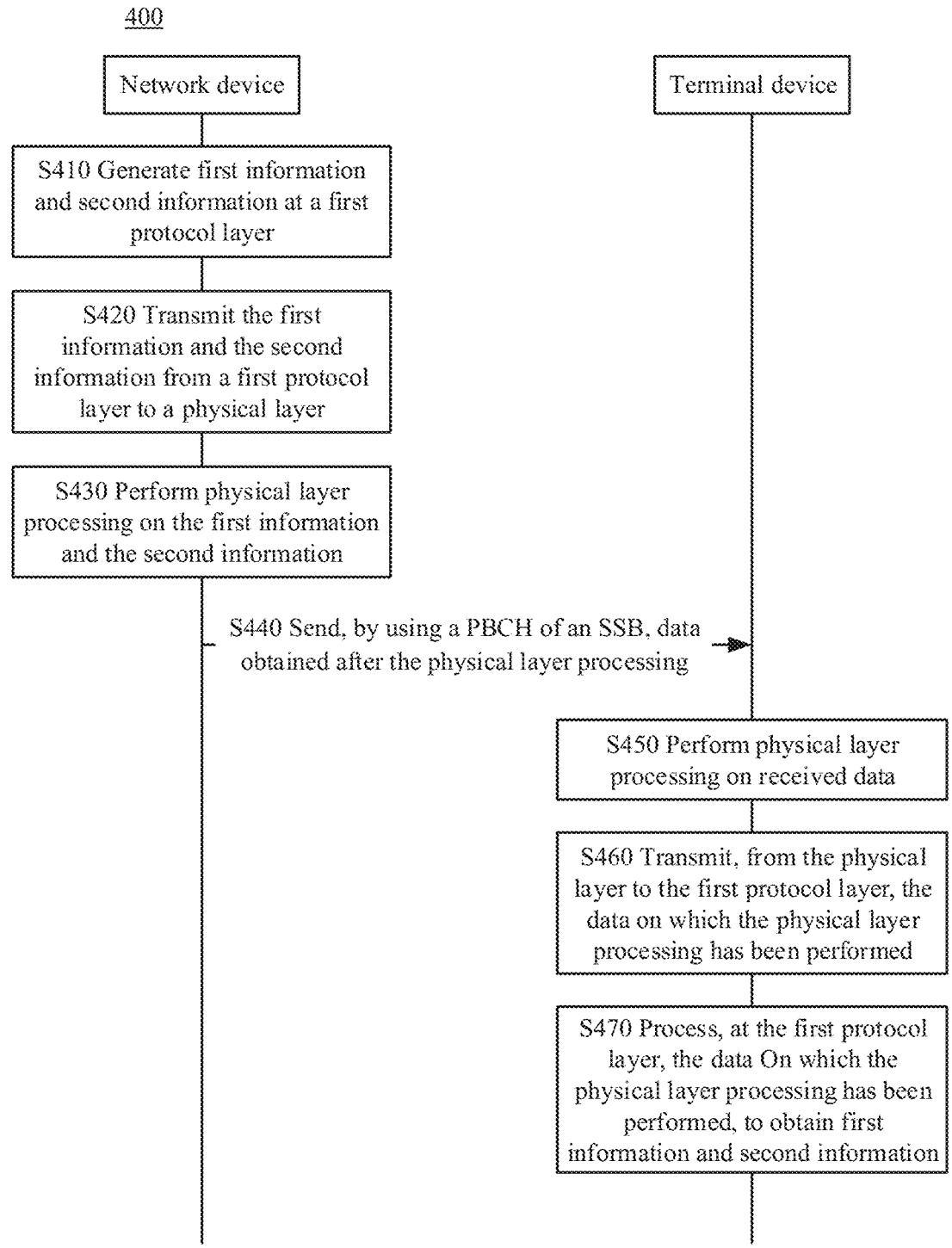
FIG. 4 is a schematic flowchart of an information sending and receiving method according to an embodiment of this application.

FIG. 4 is a schematic flowchart of an information sending and receiving method 400 according to an embodiment of this application from a perspective of device interaction.

As shown in FIG. 4, the method 400 includes the following steps.

S410. A network device generates first information and second information at a first protocol layer.

The first information may be system information. Specifically, the system information may be system information in LIE, or may be system information defined in an NR standard. As an example instead of a limitation, the system information may include configuration information of a system bandwidth (System Bandwidth) value, a system frame number (System Frame Number, SFN), or remaining minimum system information (Remaining Minimum System Information, RMSI). The configuration information of the RMSI is used to indicate a time-frequency resource and a subcarrier spacing that are used to transmit the RMSI.

The second information is used to determine a time-frequency resource corresponding to one or more SSBs. In this embodiment of this application, a time domain resource corresponding to a to-be-sent SSB in an SS burst set to which the to-be-sent SSB belongs may be represented by a TI (for ease of differentiation and description, denoted as a first TI, for example, a number 1 or 2 of the SSB shown in FIG. 3) of the SSB in the SS burst set to which the SSB belongs, or may be represented by a combination of a TI (denoted as a second TI for ease of differentiation and description) of the SSB in an SS burst to which the SSB belongs and a TI (denoted as a third TI for ease of differentiation and description) of the SS burst in an SS burst set to which the SS burst belongs.

In other words, the second information may include a first TI of a to-be-sent SSB in an SS burst set, or a combination of a second TI of a to-be-sent SSB in an SS burst and a third TI of the SS burst in an SS burst set to which the SS burst belongs.

In a sending period of each SS burst set, a relative location, of each SSB, in time domain is fixed. In other words, in a sending period of each SS burst set, TIs (including the first TI or the combination of the second TI and the third TI) of a plurality of SSBs are in a one-to-one correspondence with a plurality of time domain resources. Therefore, the network device may determine, based on a time domain resource of a currently to-be-sent SSB, the first TI or the second TI and the third TI of the SSB, in other words, determine the second information.

It should be noted that the TI may be designed not only to indicate a sequence number of a rank of an SSB in a sending period of an SS burst set, but also to indicate a frequency domain resource of the SSB. Alternatively, the TI may be designed to indicate a sequence number of a rank of an SSB in a sending period of an SS burst set, and a frequency domain resource of the SSB may be preconfigured. Therefore, the TI may be used to determine a time-frequency resource corresponding to the SSB.

In this embodiment of this application, the first protocol layer may be a protocol layer higher than a physical (Physical, PHY) layer, Optionally, the first protocol layer may be a radio resource control (radio resource control, RRC) layer.

Between the physical layer and the RRC layer, another intermediate protocol layer, for example, one or more of a media access control (MAC) layer, a radio link control (Radio Link Control, RLC) layer, or a packet data convergence protocol (Packet Data Convergence Protocol, PDCP) layer, may further be included. Alternatively, the physical layer and the RRC layer may be two adjacent protocol layers. This is not particularly limited in this embodiment of this application. It may be understood that protocol layer division in a 5G network is not clear. Therefore, a possibility of combining one or more layers in a current protocol stack in LIE or newly adding one or more protocol layers is not excluded in this embodiment of this application.

For ease of description, the following uses only an example in which the first protocol layer is an RRC layer, and description is provided with reference to a protocol stack structure in LTE. However, this should not constitute any limitation to this embodiment of this application. The first protocol layer may alternatively be another protocol layer, for example, a MAC layer or a new protocol layer defined in NR, higher than the physical layer.

S420. The network device transmits the first information and the second information from the first protocol layer to the physical layer.

S430. The network device performs physical layer processing on the first information and the second information.

S440. The network device sends, by using a PBCH in the SSB, data obtained after the physical layer processing.

After generating the first information and the second information, the network device may transmit the first information and the second information to the physical layer by using a radio bearer (Radio Bearer, RB) and by using protocol layers (a PDCP layer, an RLC layer, and a MAC layer) shown in FIG. 5 to FIG. 9, and map, at the physical layer, the data obtained after the physical layer processing is performed on the first information and the second information to a PBCH symbol in a time domain resource corresponding to an SSB indicated by the second information for sending, to transmit the data to a terminal device.

Specifically, a process (namely, a specific process front S420 to S440) in which the network device generates the first information and the second information at an RRC layer, performs processing of the RRC layer, processing of an intermediate protocol layer between the RRC layer and the physical layer, and physical layer processing on the first information and the second information, and then sends out the first information and the second information may be implemented by using any one of the following methods:

Method 1:

Specifically, the method 1 may include the following steps:

Step 1. The network device performs, at the first protocol layer, encapsulation processing on the first information and the second information that are used as a whole, to obtain a first message.

Step 2. The network device maps the first message to an intermediate channel and sends the first message to the physical layer.

Step 3. The network device performs, at the physical layer, physical layer processing on the first message received by using the intermediate channel, and sends, by using the PBCH on the time-frequency resource corresponding to the SSB, data obtained after the physical layer processing.

Figure 5:
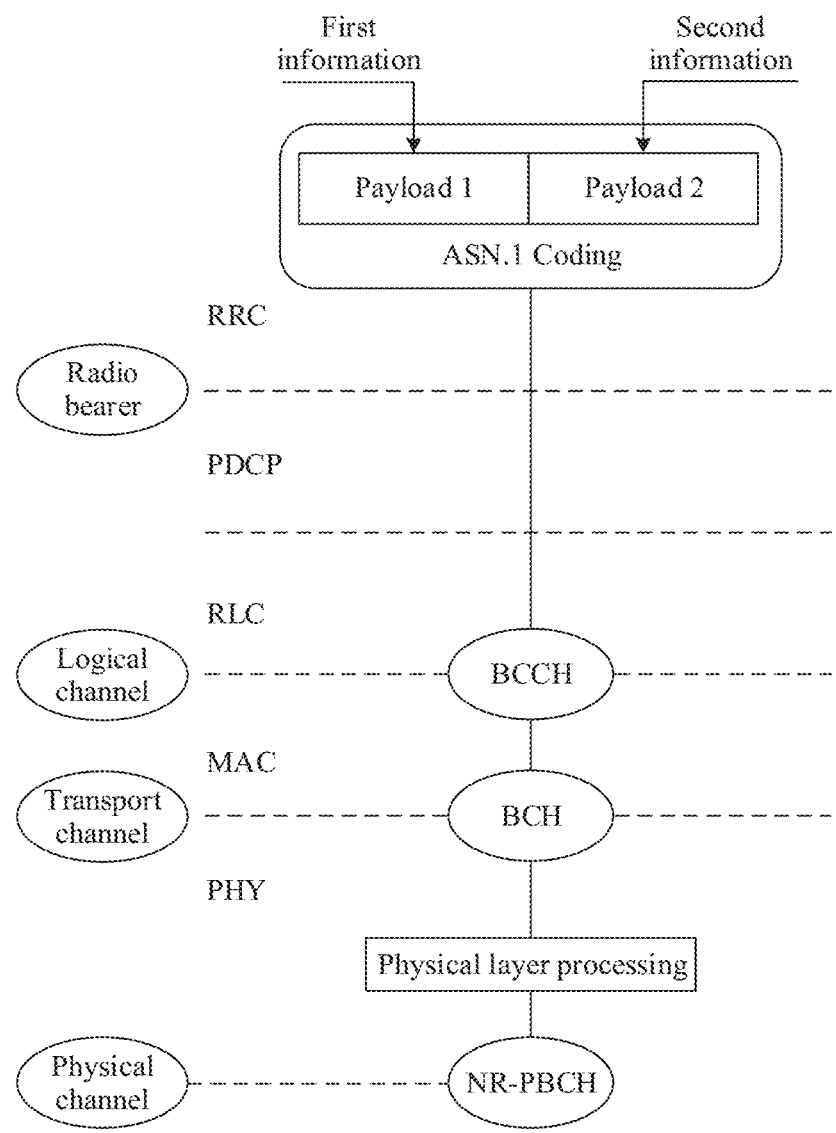
FIG. 5 is a schematic diagram of an information sending method according to an embodiment of this application.

The following describes the method 1 in detail with reference to FIG. 5. FIG. 5 is a schematic diagram of an information sending method according to an embodiment of this application. Specifically, FIG. 5 shows a processing and sending process of the first information and the second information with reference to the protocol stack structure in LTE.

As shown in FIG. 5, the protocol stack may include five protocol layers that are respectively an RRC layer, a PDCP layer, an RLC layer, a MAC layer, and a PHY layer from top to bottom.

The first information and the second information that are generated by the network device at the RRC layer may be understood as two independent payloads (payload), for example, respectively denoted as a first payload and a second payload. The first payload corresponds to the first information, and the second payload corresponds to the second information.

In step 1, the network device may use the first information and the second information as a whole, or may use the first information and the second information as a payload, for example, denoted as a third payload. Optionally, the third payload may be obtained by cascading the first payload and the second payload. The cascading may be sequentially connecting bits in the first payload and bits in the second payload. The network device performs encapsulation processing on the third payload. For example, the encapsulation processing may be abstract syntax notation (Abstract Syntax Notation, ASN.1) encapsulation processing, to obtain a first message, and the first message may be referred to as an RRC message.

Optionally, the intermediate channel includes a logical channel and/or a transport channel.

In a protocol stack structure in LTE, the intermediate channel may include a logical channel and a transport channel.

In step 2, the network device performs intermediate protocol layer processing on the first message at an intermediate protocol layer between the RRC layer (namely, an example of the first protocol layer) and the physical layer. As shown in FIG. 5, the network device may send the first message to the MAC layer by using a broadcast control channel (Broadcast Control Channel, BCCH). MAC layer processing is performed on the received first message at the MAC layer, and then the first message is sent to the physical layer by using a broadcast channel (Broadcast Control, BCH).

Herein, a protocol stack architecture in FIG. 5 is used as an example to briefly describe operations performed by the network device at the protocol layers: The network device may perform internet protocol (Internet Protocol, IP) header compression at the PDCP layer, to reduce a quantity of bits transmitted on a radio interface. The network device may perform, at the RLC layer, segmentation or cascading, retransmission control, duplicate detection, and sequence transmission to a higher layer on a data packet from the PDCP layer. The RLC layer provides a service for the PDCP layer. One RLC entity is configured for each radio bearer of one terminal. The network device may determine, at the MAC layer, a transmit format of an air interface, for example, a size of a data block, and allocate a physical layer resource based on the size of the data block, for example, determine an adjustment manner for the data block, and determine a subcarrier used to carry the data block. The network device may perform channel coding, rate matching, interleaving, scrambling, modulation, and the like at the physical layer.

It should be noted that in an LTE protocol, the MAC layer provides a service for the RLC layer in a form of a logical channel, and uses a service that appears in a form of a transport channel and that is from the physical layer.

It should be understood that, the foregoing listed content briefly describes the operations performed by the network device at the protocol layers with reference to the protocol stack structure in LTE. A specific implementation process may be the same as that in the prior art. For brevity, detailed descriptions of the specific process are omitted herein.

In step 3, after performing physical layer processing on the first message that is obtained after the intermediate protocol layer processing and that is received from the transport channel, the network device may perform resource mapping on data obtained after the physical layer processing. For example, the network device may determine a frame number of a radio frame used to transmit the data obtained after the physical layer processing and information about a specific time-frequency resource in a radio frame, map the data obtained after the physical layer processing to the time-frequency resource, and send, by using the time-frequency resource, the data obtained after the physical layer processing. It may be understood that the time-frequency resource is a PBCH symbol on the time-frequency resource corresponding to the currently sent SSB described in S410.

In the method 1, the intermediate channel includes a same logical channel and a same transport channel.

It should be understood that the foregoing listed logical channel and transport channel are merely examples for description. A possibility that one or more new channels are defined in the NR protocol to replace the logical channel and the transport channel and implement same functions is not excluded in this application.

It should be further understood that the protocol layers and the operations performed by the network device at the protocol layers described above with reference to FIG. 5 are merely examples for description, and should not constitute any limitation to the embodiments of this application. For example, the first protocol layer and the physical layer may be adjacent protocol layers, and the first message obtained after processing of the first protocol layer is performed on the first information and the second information that are generated at the first protocol layer may be directly sent to the physical layer, so that physical layer processing is performed on the first message, and the first message is sent by using a corresponding time-frequency resource. For another example, more protocol layers than those listed above may be included between the first protocol layer and the physical layer. For brevity, examples are not listed herein one by one.

Method 2:

Specifically, the method 2 may include the following steps:

Step 1. The network device performs, at the first protocol layer, encapsulation processing on the first information, to generate a first message.

Step 2. The network device performs, at the first protocol layer, encapsulation processing on the second information, to generate a second message.

Step 3. The network device maps the first message and the second message to the intermediate channel and sends the first message and the second message to the physical layer.

Step 4. The network device performs, at the physical layer, physical layer processing on the first message and the second message that are received by using the intermediate channel, and sends, by using the PBCH in the time-frequency resource corresponding to the SSB, data obtained after the physical layer processing.

Figure 6:
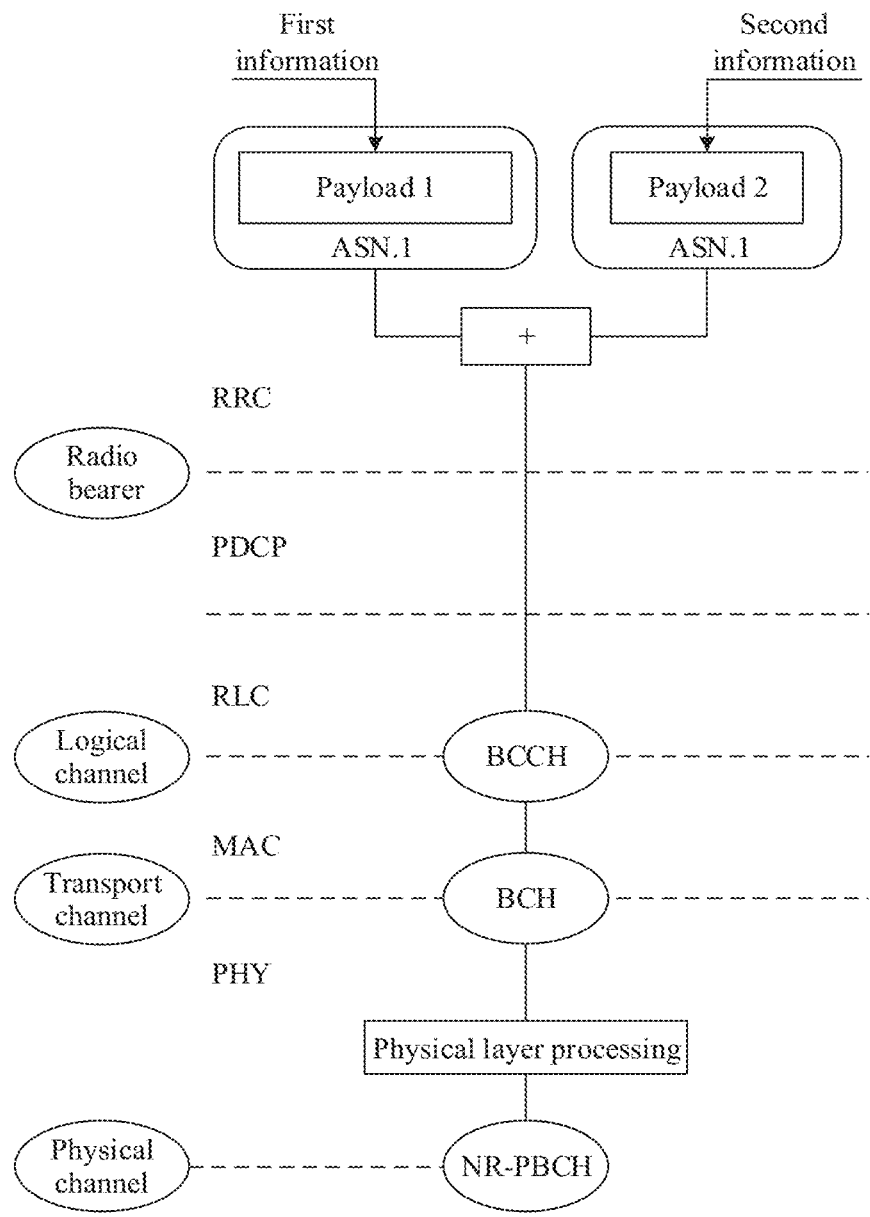
FIG. 6 is another schematic diagram of an information sending method according to an embodiment of this application.
Figure 7:
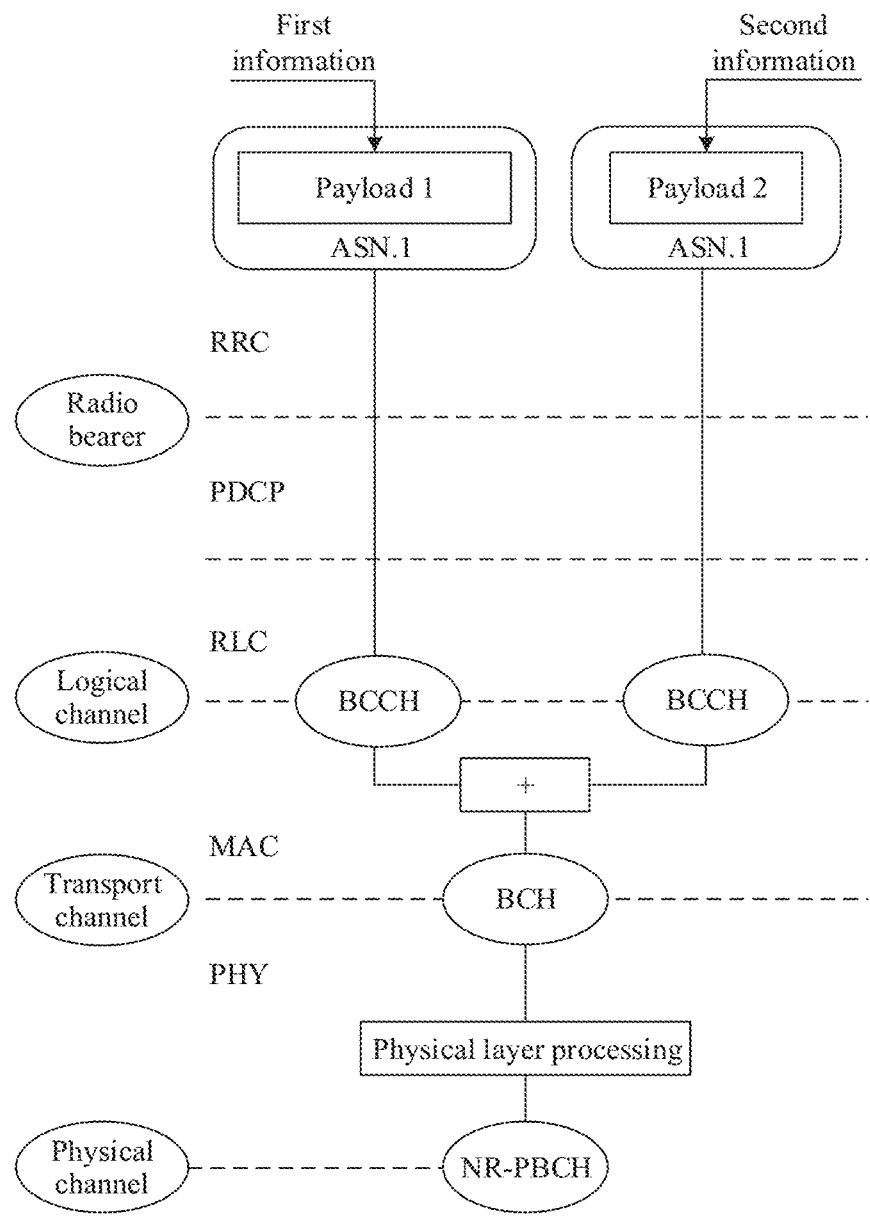
FIG. 7 is another schematic diagram of an information sending method according to an embodiment of this application.

The following describes the method 2 in detail with reference to FIG. 6 and FIG. 7. Each of FIG. 6 and FIG. 7 is another schematic diagram of an information sending method according to an embodiment of this application. Specifically, FIG. 6 and FIG. 7 separately show a processing and sending process of the first information and the second information with reference to the protocol stack structure in LTE.

As shown in FIG. 6 and FIG. 7, the protocol stack may include five protocol layers that are respectively an RRC layer, a PDCP layer, an RLC layer, a MAC layer, and a PHY layer from top to bottom.

In step 1 and step 2, the network device may perform encapsulation processing, for example, ASN.1 encapsulation processing, on the generated first information and second information at the RRC layer, to obtain the first message and the second message. Both the first message and the second message are RRC messages.

Different from the method 1, the network device performs encapsulation processing on two pieces of information at the RRC layer, to obtain two independent RRC messages.

In step 3, the two RRC messages may be sent to the physical layer by using the intermediate channel.

The intermediate channel includes a same logical channel and a same transport channel (Case 1), or the intermediate channel includes different logical channels and a same transport channel (Case 2).

Case 1:

FIG. 6 shows a processing and sending process of the first information and the second information in the case 1. As shown in FIG. 6, the first message and the second message that are generated at the RRC layer may be used as a whole, and then mapped to a logical channel and sent to the MAC layer. In this process, the network device may sequentially process, at each protocol layer, data from an upper-layer protocol layer, and send the data to a lower-layer protocol layer. The network device may combine the first message and the second message at any one of the RRC layer, the PDCP layer, and the RLC layer, to obtain a combined first message and second message, then map the combined first message and second message in the logical channel, and send the combined first message and second message to the MAC layer. Then, after performing, at the MAC layer, MAC layer processing on the combined first message and second message that are received from the logical channel, the network device may further map the combined first message and second message to a same transport channel and send the combined first message and second message to a physical layer.

Case 2:

FIG. 7 shows a processing and sending process of the first information and the second information in the case 2. As shown in FIG. 7, the first message and the second message that are generated at the RRC layer may be sent to the MAC layer by using different logical channels. The network device may process, sequentially at the RRC layer, the PDCP layer, and the RLC layer, data from an upper-layer protocol layer, and send the data to a lower-layer protocol layer. After receiving, at MAC by using different logical channels, the first message and the second message on which upper layer processing has been performed, the network device may combine the received first message and second message, to obtain a combined first message and second message, then map the combined first message and second message to a same transport channel, and send the combined first message and second message to the physical layer.

In step 4, the network device performs physical layer processing on the data received from the intermediate channel, to obtain data on which the physical layer processing has been performed. Specifically, the physical layer processing may include: channel coding, rate matching, interleaving, scrambling, modulation, and the like.

The network device maps the data obtained after the physical layer processing to a PBCH, and sends, by using the PBCH, the data obtained after the physical layer processing. The time-frequency resource is a PBCH symbol on the time-frequency resource corresponding to the currently sent SSB described in S410.

It should be understood that the foregoing listed two cases are merely examples for description, and should not constitute any limitation to this embodiment of this application. For example, the first protocol layer and the physical layer may be adjacent protocol layers. A channel between the first protocol layer and the physical layer may be a logical channel or a transport channel, or another channel used to implement a same or similar function. The first message and the second message that are generated at the first protocol layer may be directly sent to the physical layer by using an intermediate channel located between the first protocol layer and the physical layer.

It should be further understood that in the method 2, operations performed by the network device at the protocol layers may be similar to the operations in the method 1, but objects operated at some protocol layers are different. For brevity, detailed descriptions of the operations performed by the network device at the protocol layers are omitted herein.

Method 3:

Specifically, the method 3 may include the following steps:

Step 1. The network device performs, at the first protocol layer, encapsulation processing on the first information, to generate a first message.

Step 2. The network device performs, at the first protocol layer, encapsulation processing on the second information, to generate a second message.

Step 3. The network device maps the first message to a first intermediate channel and sends the first message to the physical layer.

Step 4. The network device maps the second message to a second intermediate channel and sends the second message to the physical layer.

Step 5. The network device performs, at the physical layer, physical layer processing on the first message received by using the first intermediate channel and the second message received by using the second intermediate channel, and sends, by using the PBCH in the time-frequency resource corresponding to the SSB, data obtained after the physical layer processing, where the first message and the second message are used as a whole.

Figure 8:
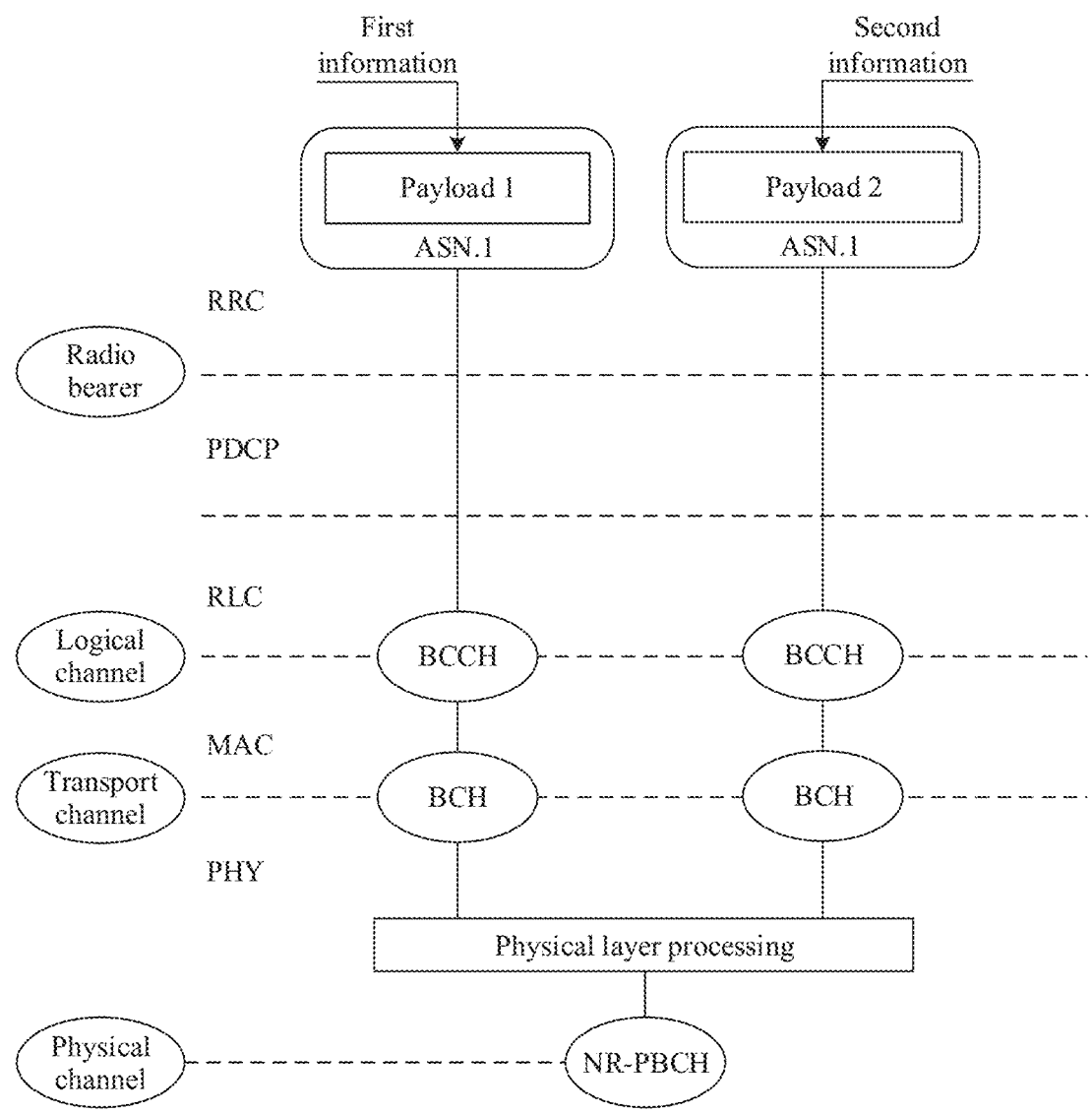
FIG. 8 is another schematic diagram of an information sending method according to an embodiment of this application.

The following describes the method 3 in detail with reference to FIG. 8. FIG. 8 is another schematic diagram of an information sending method according to an embodiment of this application. Specifically, FIG. 8 shows a processing and sending process of the first information and the second information with reference to the protocol stack structure in LTE.

As shown in FIG. 8, the protocol stack may include five protocol layers that are respectively an RRC layer, a PDCP layer, an RLC layer, a MAC layer, and a PHY layer from top to bottom.

In step 1 and step 2, the network device may perform encapsulation processing, for example, ASN.1 encapsulation processing, on the generated first information and second information at the RRC layer, to obtain the first message and the second message. Both the first message and the second message are RRC messages.

In step 3 and step 4, the network device respectively maps the first message and the second message to the first intermediate channel and the second intermediate channel, and sends the first message and the second message to the physical layer. Different from the method 2, the network device processes the first message and the second message at the intermediate protocol layer higher than the physical layer. Therefore, the network device receives, at the physical layer, the two messages on which the intermediate protocol layer processing has been performed.

Optionally, the intermediate channel includes a logical channel and/or a transport channel.

In other words, the network device may map the first message to the first logical channel and send the first message to the MAC layer, and then map the first message on which MAC layer processing has been performed to a first transport channel and send the first message to the physical layer. Correspondingly, the network device may map the second message to the second logical channel and send the second message to the MAC layer, and then map the second message on which the MAC layer processing has been performed to a second transport channel and send the second message to the physical layer.

It should be understood that the foregoing listed intermediate channels are merely examples for description, and should not constitute any limitation to this embodiment of this application. For example, the first protocol layer and the physical layer may be adjacent protocol layers. A channel between the first protocol layer and the physical layer may be a logical channel or a transport channel, or another channel used to implement a same or similar function. The first message and the second message that are generated at the first protocol layer may be directly sent to the physical layer by using two different intermediate channels located between the first protocol layer and the physical layer. Alternatively, there may be more protocol layers and channels between the first protocol layer and the physical layer, and the intermediate channel may include channels between the first protocol layer and the intermediate protocol layer, between the physical layer and the intermediate protocol layer, and between the intermediate protocol layers.

In step 5, the network device combines, at the physical layer, the two messages on which the intermediate protocol layer processing has been performed, and performs physical layer processing on the two messages on which the intermediate protocol layer processing has been performed and that are used as a whole. Specifically, the physical layer processing may include: channel coding, rate matching, interleaving, scrambling, modulation, and the like.

The network device maps data obtained after the physical layer processing to a PBCH, and sends, by using the PBCH, the data obtained after the physical layer processing. The time-frequency resource is a PBCH symbol on the time-frequency resource corresponding to the currently sent SSB described in S410.

It should be further understood that in the method 3, operations performed by the network device at the protocol layers may be similar to the operations in the method 1, but objects operated at some protocol layers are different. For brevity, detailed descriptions of the operations performed by the network device at the protocol layers are omitted herein.

Method 4:

Specifically, the method 4 may include the following steps:

Step 1. The network device performs, at the first protocol layer, encapsulation processing on the first information, to generate a first message.

Step 2. The network device performs, at the first protocol layer, encapsulation processing on the second information, to generate a second message.

Step 3. The network device maps the first message to a first intermediate channel and sends the first message to the physical layer.

Step 4. The network device maps the second message to a second intermediate channel and sends the second message to the physical layer.

Step 5. The network device performs, at the physical layer, physical layer processing on each of the first message received by using the first intermediate channel and the second message received by using the second intermediate channel, and sends, by using the PBCH in the time-frequency resource corresponding to the SSB, data obtained after the physical layer processing.

Figure 9:
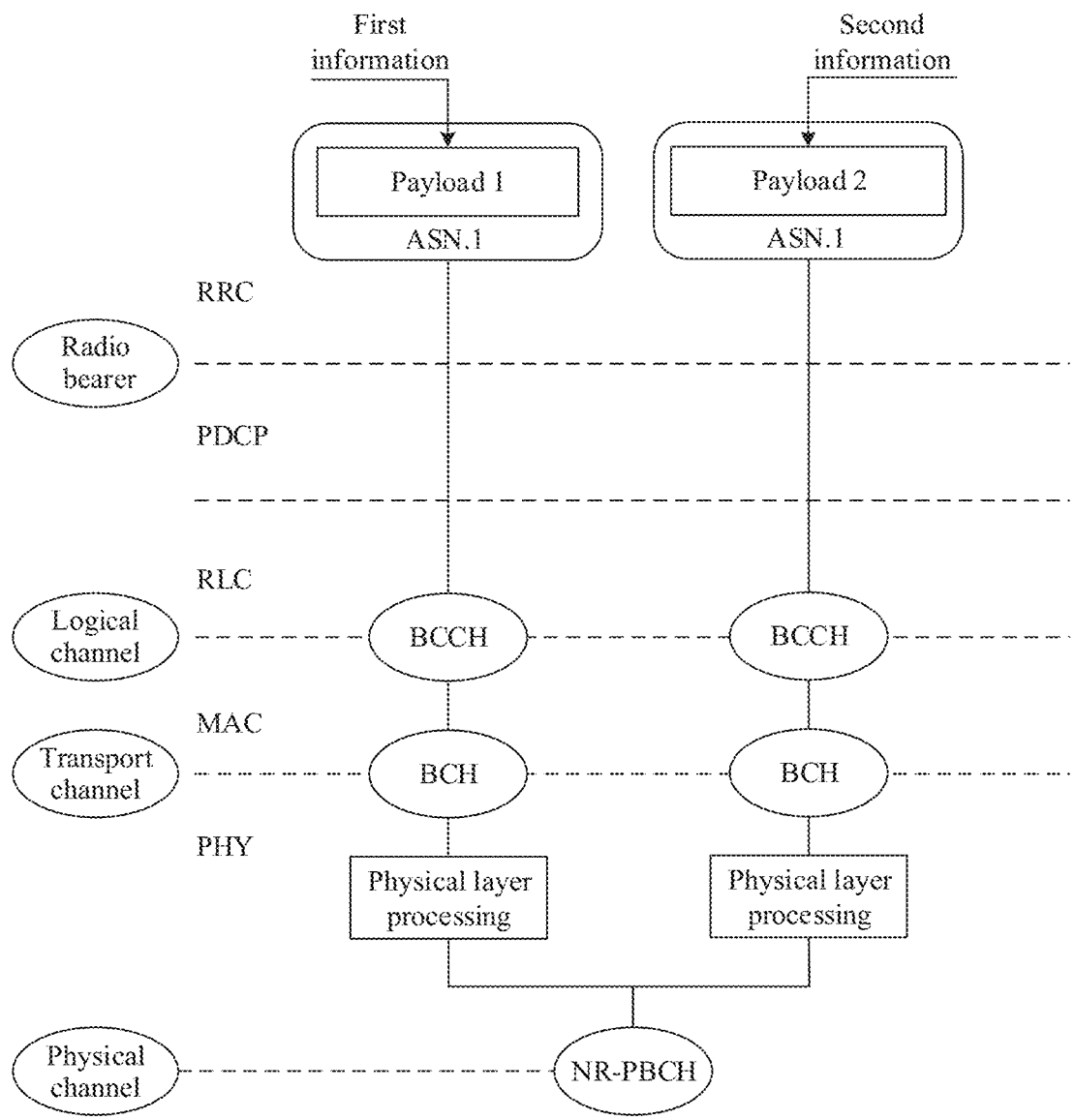
FIG. 9 is another schematic diagram of an information sending method according to an embodiment of this application.

The following describes the method 3 in detail with reference to FIG. 9. FIG. 9 is another schematic diagram of an information sending method according to an embodiment of this application. Specifically, FIG. 9 shows a processing and sending process of the first information and the second information with reference to the protocol stack structure in LTE.

As shown in FIG. 9, the protocol stack may include five protocol layers that are respectively an RRC layer, a PDCP layer, an RLC layer, a MAC layer, and a PHY layer from top to bottom.

In step 1 and step 2, the network device may perform encapsulation processing, for example, ASN.1 encapsulation processing, on the generated first information and second information at the RRC layer, to obtain the first message and the second message. Both the first message and the second message are RRC messages.

In step 3 and step 4, the network device respectively maps the first message and the second message to the first intermediate channel and the second intermediate channel, and sends the first message and the second message to the physical layer. The network device processes the first message and the second message at the intermediate protocol layer higher than the physical layer. Therefore, the network device receives, at the physical layer, the two messages on which the intermediate protocol layer processing has been performed.

Optionally, the intermediate channel includes a logical channel and/or a transport channel.

In other words, the network device may map the first message to the first logical channel and send the first message to the MAC layer, then map the first message on which MAC layer processing has been performed to a first transport channel, and send the first message to the physical layer. Correspondingly, the network device may map the second message to the second logical channel and send the second message to the MAC layer, and then map the second message on which the MAC layer processing has been performed to a second transport channel and send the second message to the physical layer.

It should be understood that the foregoing listed intermediate channels are merely examples for description, and should not constitute any limitation to this embodiment of this application. For example, the first protocol layer and the physical layer may be adjacent protocol layers. A channel between the first protocol layer and the physical layer may be a logical channel or a transport channel, or another channel used to implement a same or similar function. The first message and the second message that are generated at the first protocol layer may be directly sent to the physical layer by using two different intermediate channels located between the first protocol layer and the physical layer. Alternatively, there may be more protocol layers and channels between the first protocol layer and the physical layer, and the intermediate channel may include channels between the first protocol layer and the intermediate protocol layer, between the physical layer and the intermediate protocol layer, and between the intermediate protocol layers.

In step 5, the network device performs physical layer processing on each of the first message received from the first intermediate channel and the second message received from the second intermediate channel. Different from the method 3, the network device performs, at the physical layer, physical layer processing on the two messages on which the intermediate protocol layer processing has been performed, to obtain data on which the physical layer processing has been performed, where the data may include first data and second data, the first data includes the first message, and the second data includes the second message.

The network device maps the first data and the second data obtained after the physical layer processing to a PBCH, and sends, by using the PBCH, the data obtained after the physical layer processing. The PBCH is a PBCH symbol on the time-frequency resource corresponding to the currently sent SSB described in S410.

It should be understood that in the method 4, operations performed by the network device at the protocol layers may be similar to the operations in the method 1, but objects operated at some protocol layers are different. For brevity, detailed descriptions of the operations performed by the network device at the protocol layers are omitted herein.

It should be further understood that the foregoing descriptions with reference to FIG. 5 to FIG. 9 are examples for description by using the protocol stack structure in LTE as a possible protocol stack structure, and should not constitute any limitation to this embodiment of this application. A possibility that the same protocol stack structure is still used in the NR protocol, but a function of each protocol layer entity is redefined, and a possibility that a protocol stack structure and a function of each protocol layer entity are redefined in the NR protocol are not excluded in this application.

In S440, the terminal device receives, on the PBCH, the data sent by the network device.

It may be understood that the data received by the terminal device on the PBCH includes the first information and the second information, the first information and the second information are generated by the network device at the first protocol layer, and are sent by using the PBCH on the time-frequency resource corresponding to the SSB, and a time domain resource location of the SSB may be determined based on the second information.

S450. The terminal device performs physical layer processing on the received data.

S460. The terminal device transmits, from the physical layer to the first protocol layer, the data on which the physical layer processing has been performed.

S470. The terminal device processes, at the first protocol layer, the data on which the physical layer processing has been performed, to obtain first information and second information.

Corresponding to S420 to S440, a process in which the terminal device processes the received data to obtain the first information and the second information at the first protocol layer in S450 to S470 corresponds to, or is reversible to a process in which the network device processes the first information and the second information that are generated at the first protocol layer, to obtain the data on which the physical layer processing has been performed.

The terminal device may also process the received data by using any one of the foregoing four methods. However, it should be noted that the processing method used by the network device corresponds to that used by the terminal device. In a protocol, a data processing method may be predefined, and the network device and the terminal device may send and receive information according to the predefined processing method.

Specifically, a process (namely, a specific process from S450 to S470) in which the terminal device processes the received data to obtain the first information and the second information at the first protocol layer may be implemented by using any one of the following methods:

Method 1:

The terminal device performs the physical layer processing on the received data at the physical layer, to obtain data on which the physical layer processing has been performed.

The terminal device maps the data on which the physical layer processing has been performed to the intermediate channel, and sends the data to the first protocol layer.

The terminal device performs, at the first protocol layer, decapsulation processing on the data received by using the intermediate channel, to obtain the first information and the second information.

The intermediate channel includes a same logical channel and a same transport channel.

Method 2:

The terminal device performs the physical layer processing on the received data at the physical layer, to obtain data on which the physical layer processing has been performed.

The terminal device maps the data on which the physical layer processing has been performed to the intermediate channel, and sends the data to the first protocol layer.

The terminal device performs, at the first protocol layer, decapsulation processing on the data received by using the intermediate channel, to obtain the first information and the second information.

The intermediate channel includes a same logical channel and a same transport channel, or the intermediate channel includes different logical channels and a same transport channel.

Method 3:

The terminal device performs physical layer processing on the received data at the physical layer, to obtain first data and second data on which the physical layer processing has been performed.

The terminal device maps the first data on which the physical layer processing has been performed to a first intermediate channel, and sends the first data to the first protocol layer.

The terminal device maps the second data on which the physical layer processing has been performed to a second intermediate channel, and sends the second data to the first protocol layer.

The terminal device performs, at the first protocol layer, decapsulation processing on the first data received by using the first intermediate channel, to obtain the first information.

The terminal device performs, at the first protocol layer, decapsulation processing on the second data received by using the second intermediate channel, to obtain the second information.

Method 4:

That the terminal device processes the received data, to obtain the first information and the second information at the first protocol layer includes:

performing, by the terminal device, physical layer processing on the received third data at the physical layer, to obtain the third data on which the physical layer processing has been performed;

performing, by the terminal device, physical layer processing on the received fourth data at the physical layer, to obtain the fourth data on which the physical layer processing has been performed;

mapping, by the terminal device, the third data on which the physical layer processing has been performed to a first intermediate channel, and sending the third data to the first protocol layer;

mapping, by the terminal device, the fourth data on which the physical layer processing has been performed to a second intermediate channel, and sending the fourth data to the first protocol layer;

performing, by the terminal device at the first protocol layer, decapsulation processing on the third data received by using the first intermediate channel, to obtain the first information: and performing, by the terminal device, at the first protocol layer, decapsulation processing on the fourth data received by using the second intermediate channel, to obtain the second information.

It should be understood that a specific process in which the terminal device processes the received data by using any one of the foregoing methods is similar to a specific process in which the network device processes and sends the first information and the second information by using a corresponding method. For brevity, detailed descriptions of the specific process are omitted herein.

Optionally, the method 400 further includes:

determining, by the terminal device based on the second information, a time domain resource corresponding to the SSB, to implement time sequence alignment with a cell radio frame based on the time domain resource corresponding to the SSB.

It is already described in S410 that the second information may include a first TI of a to-be-sent SSB in an SS burst set, or a combination of a second TI of a to-be-sent SSB in an SS burst and a third TI of the SS burst in an SS burst set to which the SS burst belongs.

After obtaining the first TI or the combination of the second TI and the third TI from the second information, the terminal device may determine, based on a pre-specified one-to-one correspondence between a time domain resource location of an SSB and a TI of the SSB, a time-frequency resource location corresponding to the received SSB, and deduce a frame boundary and a slot boundary, to implement time sequence alignment with a cell radio frame.

It should be understood that a specific process of time sequence alignment between the terminal device and the cell radio frame may be the same as that in the prior art. For brevity, detailed descriptions of the specific process are omitted herein.

Therefore, in this embodiment of this application, the network device generates the first information and the second information at the first protocol layer, and sends the first information and the second information to the terminal device by using the PBCH in the SSB determined based on the second information, so that the terminal device can process the received data, to obtain the first information and the second information at the first protocol layer, to determine the time-frequency resource of the SSB, deduce the frame boundary and the slot boundary, and implement time sequence alignment with the cell radio frame. This is applicable to an NR multibeam scenario.

The foregoing describes in detail the information sending and receiving method in the embodiments of this application with reference to FIG. 4 to FIG. 9. The following describes in detail a network device and a terminal device in the embodiments of this application with reference to FIG. 10 to FIG. 13.

Figure 10:
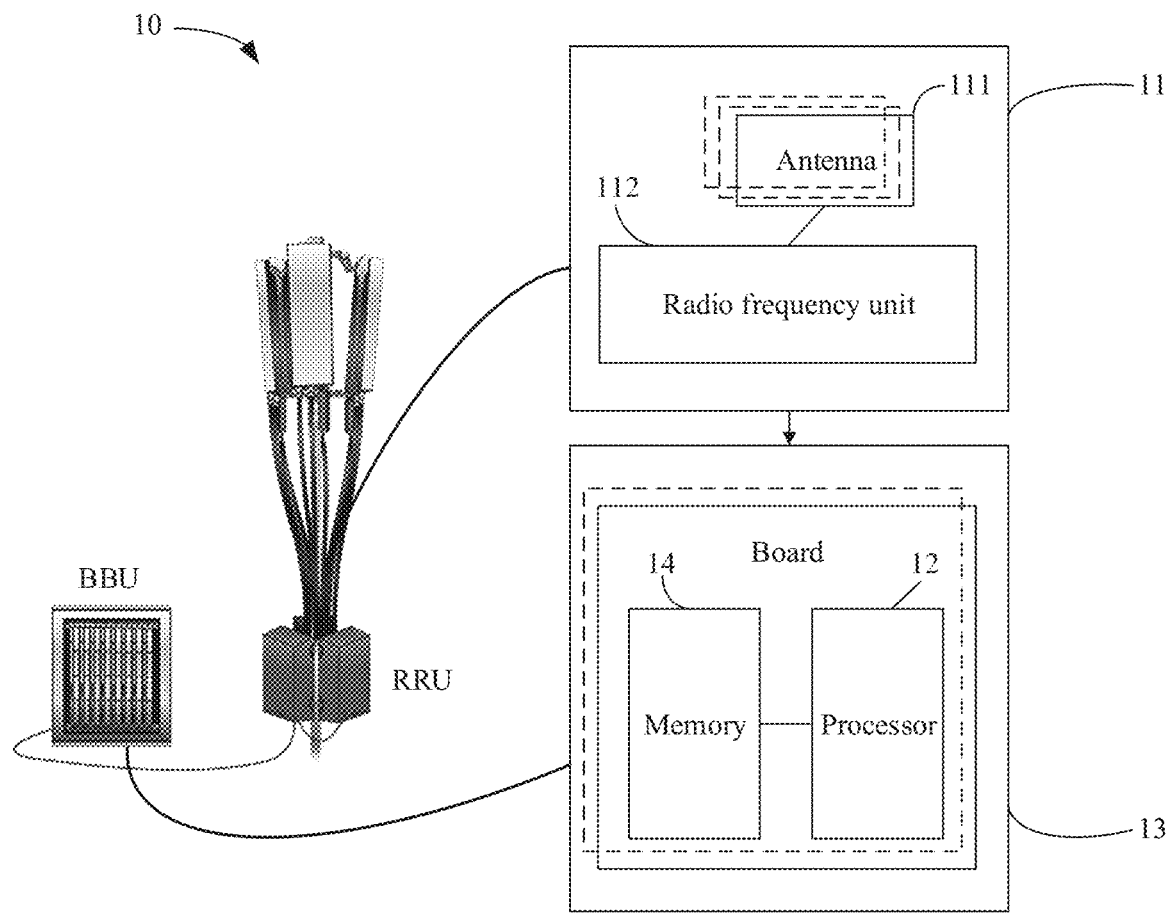
FIG. 10 is a schematic structural diagram of a network device according to an embodiment of this application.

An embodiment of the present invention further provides a network device. The following describes a structure and functions of the network device with reference to FIG. 10. FIG. 10 is a schematic structural diagram of a network device 10 according to an embodiment of this application. The network device 10 may be the network device in the information sending and receiving method 400 shown in FIG. 4. As shown in FIG. 10, the network device 10 includes a transceiver 11 and a processor 12.

Optionally, the transceiver 11 may be referred to as a remote radio unit (remote radio unit, RRU), a transceiver unit, a receiver/transmitter, a transceiver circuit, or the like. The transceiver 11 may include at least one antenna 111 and a radio frequency unit 112, and the transceiver 11 may be configured to: receive and send a radio frequency signal, and perform conversion between a radio frequency signal and a baseband signal.

Optionally, the network device 10 includes one or more baseband units (Baseband Unit, BBU) 13. The baseband unit includes the processor 12. The baseband unit 13 is mainly configured to: perform baseband processing, such as channel coding, multiplexing, modulation, and spectrum spreading, and control the base station. The transceiver 11 and the baseband unit 13 may be physically disposed together or may be physically separated from each other, namely, a distributed base station.

In an example, the baseband unit 13 may include one or more boards, and a plurality of boards may jointly support a radio access network of a single access standard, or may separately support radio access networks of different access standards. The baseband unit 13 includes the processor 12. The processor 12 may be configured to control the network device 10 to perform corresponding operations in the foregoing method embodiments described with reference to FIG. 4 to FIG. 9. Optionally, the baseband unit 13 may further include a memory 14, configured to store a necessary instruction and necessary data.

Specifically, the processor 12 is configured to generate first information and second information at a first protocol layer, where the first information includes system information, the second information is used to determine a time-frequency resource corresponding to one or more synchronization signal blocks SSBs, and the first protocol layer is a protocol layer higher than a physical layer.

The processor 12 is further configured to transmit the first information and the second information from the first protocol layer to the physical layer.

The processor 12 is further configured to perform physical layer processing on the first information and the second information.

The transceiver 11 is configured to send, by using a physical broadcast channel PBCH in the SSB, data obtained after the physical layer processing.

It should be understood that the network device 10 may correspond to the network device in the information sending and receiving method 400 according to the embodiments of the present invention. The network device 10 may include a module configured to perform the method performed by the network device in the information sending and receiving method 400 in FIG. 4. In addition, the modules in the network device 10 and the foregoing other operations and/or functions are respectively intended to implement corresponding procedures of the information sending and receiving method 400 in FIG. 4. Specifically, the processor 12 is configured to perform S410 to S430 in the method 400, and the transceiver 11 is configured to perform S440 in the method 400. For a specific process of performing the foregoing corresponding steps by the modules, refer to the foregoing descriptions with reference to the method embodiments of FIG. 4 to FIG. 9. For brevity, details are not described herein again.

Figure 11:
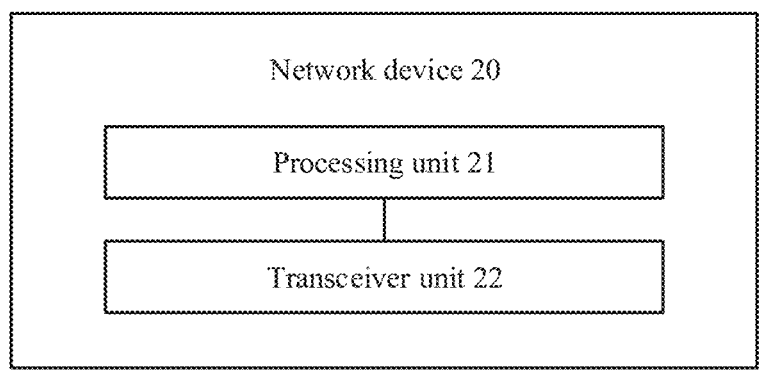
FIG. 11 is another schematic structural diagram of a network device according to an embodiment of this application.

An embodiment of the present invention further provides a network device. The following describes a structure and functions of the network device with reference to FIG. 11. FIG. 11 is a schematic structural diagram of a network device 20 according to an embodiment of this application. The network device 20 may be the network device in the information sending and receiving method 400 shown in FIG. 4. As shown in FIG. 11, the network device 20 includes a processing unit 21 and a transceiver unit 22. The processing unit 21 and the transceiver unit 22 may be implemented by software or hardware. When the processing unit 21 and the transceiver unit 22 are implemented by hardware, the processing unit 21 may be the processor 12 in FIG. 10, and the transceiver unit 22 may be the transceiver 11 in FIG. 10.

Figure 12:
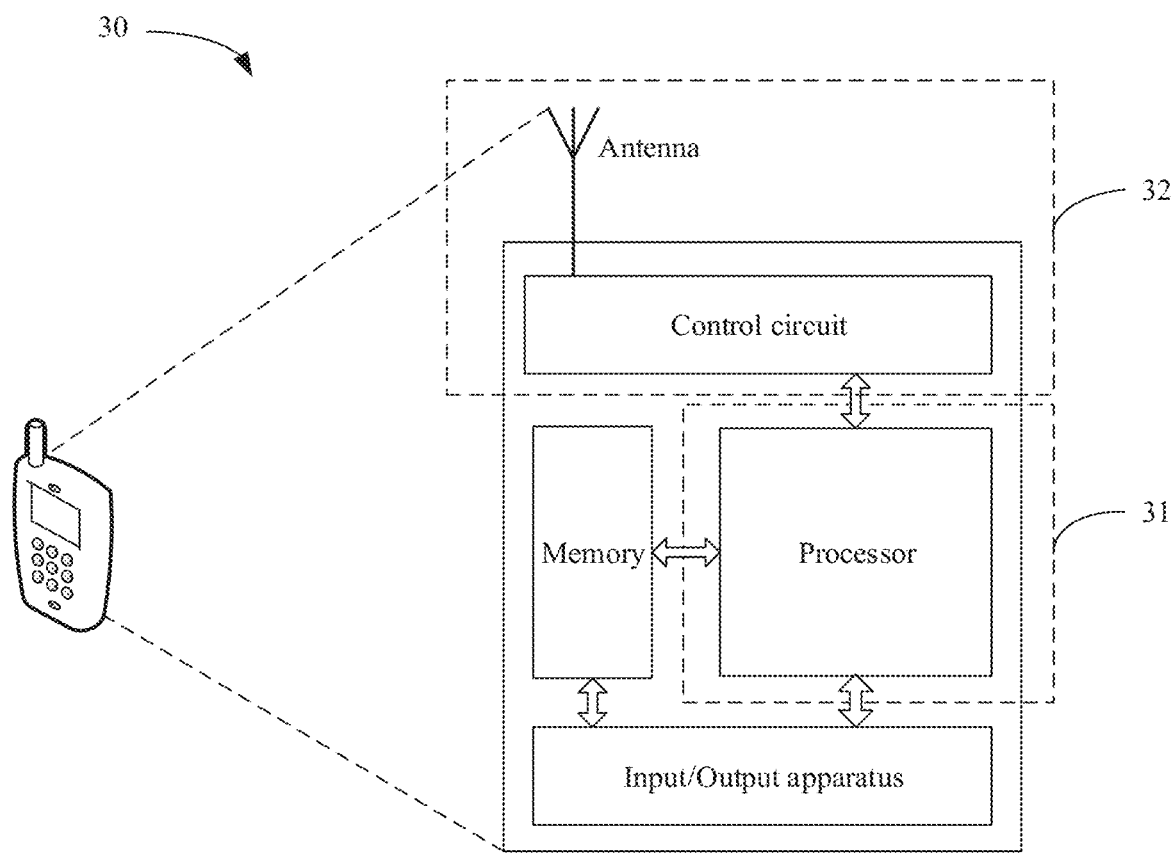
FIG. 12 is a schematic structural diagram of a terminal device according to an embodiment of this application.

An embodiment of this application further provides a terminal device. The following describes a structure and functions of the terminal device with reference to FIG. 12. FIG. 12 is a schematic structural diagram of a terminal device 30 according to an embodiment of this application. The terminal device 30 may be the terminal device in the information sending and receiving method 400 shown in FIG. 4. As shown in FIG. 12, the terminal device 30 includes a processor 31 and a transceiver 32.

Optionally, the transceiver 32 may include a control circuit and an antenna. The control circuit may be configured to: perform conversion between a baseband signal and a radio frequency signal, and process the radio frequency signal; and the antenna may be configured to receive and send a radio frequency signal.

Optionally, the terminal device 30 may further include a memory, an input/output apparatus, and the like.

The processor 31 may be configured to: process a communication protocol and communication data, control the entire terminal device, execute a software program, and process data of the software program, for example, configured to support the terminal device in performing the foregoing corresponding operations described with reference to FIG. 4 to FIG. 9. The memory is mainly configured to store the software program and the data. After the terminal device is powered on, the processor 31 may read a software program in the memory, explain and execute an instruction of the software program, and process the data of the software program.

Specifically, the transceiver 31 is configured to receive, on a physical broadcast channel PBCH, data sent by a network device, where the data includes first information and second information, the first information and the second information are generated by the network device at a first protocol layer, the first information includes system information, the second information is used to determine a time-frequency resource corresponding to one or more synchronization signal blocks SSBs, the PBCH is located on the time-frequency resource corresponding to the SSB, and the first protocol layer is a protocol layer higher than the physical layer.

The processor 32 is configured to perform physical layer processing on the received data at the physical layer.

The processor 32 is further configured to transmit, from the physical layer to the first protocol layer, the data on which the physical layer processing has been performed.

Specifically, the transceiver 32 is configured to receive, on a physical broadcast channel PBCH, data sent by a network device, where the data includes first information and second information, the first information and the second information are generated by the network device at a first protocol layer, the first information includes system information, the second information is used to determine a time-frequency resource corresponding to one or more synchronization signal blocks SSBs, the PBCH is located on the time-frequency resource corresponding to the SSB, and the first protocol layer is a protocol layer higher than the physical layer.

The processor 31 is configured to perform physical layer processing on the received data at the physical layer.

The processor 31 is further configured to transmit, from the physical layer to the first protocol layer, the data on which the physical layer processing has been performed.

The processor 31 is further configured to process, at the first protocol layer, the data on which the physical layer processing has been performed, to obtain the first information and the second information.

It should be understood that the terminal device 30 may correspond to the terminal device in the information sending and receiving method 400 according to the embodiments of the present invention. The terminal device 30 may include a module configured to perform the method performed by the terminal device in the information sending and receiving method 400 in FIG. 4. In addition, the modules in the terminal device 30 and the foregoing other operations and/or functions are respectively intended to implement corresponding procedures of the information sending and receiving method 400 in FIG. 4. Specifically, the transceiver 32 is configured to perform S440 in the method 400, and the processor 32 is configured to perform S450 to S470 in the method 400. For a specific process of performing the foregoing corresponding steps by the modules, refer to the foregoing descriptions with reference to the method embodiments of FIG. 4 to FIG. 9, especially descriptions with reference to FIG. 4 to FIG. 9. For brevity, details are not described herein again.

Figure 13:
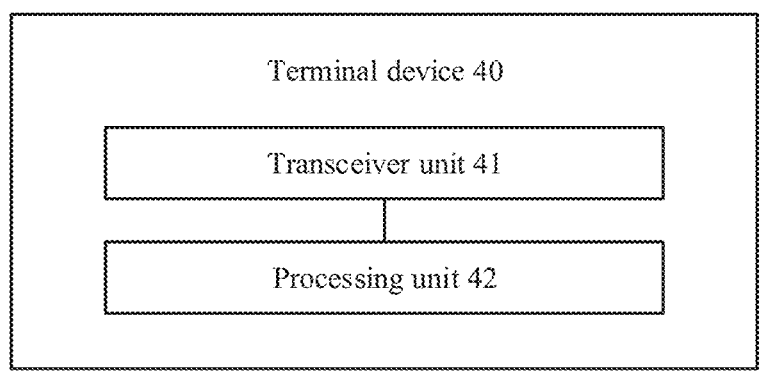
FIG. 13 is another schematic structural diagram of a terminal device according to an embodiment of this application.

An embodiment of this application further provides a terminal device. The following describes a structure and functions of the terminal device with reference to FIG. 13. FIG. 13 is a schematic structural diagram of a terminal device 40 according to an embodiment of this application. The terminal device 40 may be the terminal device in the information sending and receiving method 400 shown in FIG. 4. As shown in FIG. 13, the terminal device 40 includes a transceiver unit 41 and a processing unit 42. The transceiver unit 41 and the processing unit 42 may be implemented by software or hardware. When the transceiver unit 41 and the processing unit 42 are implemented by hardware, the transceiver unit 41 may be the transceiver 32 in FIG. 12, and the processing unit 42 may be the processor 31 in FIG. 1L.

It should be understood that in this embodiment of this application, the processor may be a central processing unit (central processing unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like.

It should be further understood that the memory in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM. EEPROM), or a flash memory. The volatile memory may be a random access memory (random access memory, RAM), used as an external cache. Through example but not limitative description, many forms of random access memories (random access memory-, RAM) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by means of software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a special-purpose computer, a computer network, or other programmable apparatuses. The computer instruction may be stored in a computer-readable storage medium, or may be transmitted from one computer-readable storage medium to another computer-readable storage medium. For example, the computer instruction may be transmitted from one website, computer, server, or data center to another website, computer, server, or data center in a wired (for example, infrared, radio, or microwave) manner. The computer-readable storage medium may be any usable medium accessible by a computer, or a data storage device, such as a server or a data center, including one or more usable medium sets. The usable medium may be a magnetic medium (such as a floppy disk, a hard disk, or a magnetic tape), an optical medium (such as a digital versatile disc (digital versatile disc, DVD)), a semiconductor medium, or the like. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "i" in this specification usually indicates an "or" relationship between the associated objects.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An information sending method, comprising:
generating, by a network device, first information and second information at a first protocol layer, wherein the first information comprises system information, the second information is used to determine a time-frequency resource corresponding to one or more synchronization signal blocks (SSBs), and the first protocol layer is a protocol layer higher than a physical layer;
transmitting, by the network device, the first information and the second information from the first protocol layer to the physical layer;
performing, by the network device, physical layer processing on the first information and the second information; and
sending, by the network device by using a physical broadcast channel (PBCH) in the one or more SSBs, data obtained based on the physical layer processing.

2. The method according to claim 1, wherein the transmitting, by the network device, the first information and the second information from the first protocol layer to the physical layer comprises:
performing, by the network device at the first protocol layer, encapsulation processing on the first information and the second information that are used as a whole, to generate a first message; and
mapping, by the network device, the first message to an intermediate channel between the first protocol layer and the physical layer and sending the first message to the physical layer, wherein
the intermediate channel includes a same logical channel and a same transport channel.

3. The method according to claim 1, wherein the transmitting, by the network device, the first information and the second information from the first protocol layer to the physical layer comprises:
performing, by the network device at the first protocol layer, encapsulation processing on the first information, to generate a first message;
performing, by the network device at the first protocol layer, encapsulation processing on the second information, to generate a second message; and
mapping, by the network device, the first message and the second message to an intermediate channel between the first protocol layer and the physical layer and sending the first message and the second message to the physical layer, wherein
the intermediate channel consists of a same logical channel and a same transport channel, or the intermediate channel consists of different logical channels and a same transport channel.

4. The method according to claim 1, wherein the transmitting, by the network device, the first information and the second information from the first protocol layer to the physical layer comprises:
performing, by the network device at the first protocol layer, encapsulation processing on the first information, to generate a first message;
performing, by the network device at the first protocol layer, encapsulation processing on the second information, to generate a second message;
mapping, by the network device, the first message to a first intermediate channel between the first protocol layer and the physical layer and sending the first message to the physical layer; and
mapping, by the network device, the second message to a second intermediate channel between the first protocol layer and the physical layer and sending the second message to the physical layer.

5. An information receiving method, comprising:
receiving, by a terminal device on a physical broadcast channel (PBCH), data sent by a network device;
performing, by the terminal device, physical layer processing on the received data at a physical layer;
transmitting, by the terminal device from the physical layer to a first protocol layer, the data on which the physical layer processing has been performed; and
processing, by the terminal device at the first protocol layer, the data on which the physical layer processing has been performed, to obtain first information and second information, wherein the first information comprises system information, and the second information is used to determine a time-frequency resource corresponding to one or more synchronization signal blocks (SSBs) that carry the data.

6. A network device, comprising:
a non-transitory memory storage comprising instructions;
one or more hardware processors in communication with the non-transitory memory storage, wherein the one or more hardware processors execute the instructions to:
generate first information and second information at a first protocol layer, wherein the first information comprises system information, the second information is used to determine a time-frequency resource corresponding to one or more synchronization signal blocks (SSBs), and the first protocol layer is a protocol layer higher than a physical layer, wherein
transmit the first information and the second information from the first protocol layer to the physical layer; and
perform physical layer processing on the first information and the second information; and
a transceiver that is configured to send, by using a physical broadcast channel (PBCH) in the one or more SSBs, data obtained based on the physical layer processing.

7. The network device according to claim 6, wherein the one or more hardware processors execute the instructions to:
perform, at the first protocol layer, encapsulation processing on the first information and the second information that are used as a whole, to generate a first message; and
map the first message to an intermediate channel between the first protocol layer and the physical layer and send the first message to the physical layer, wherein
the intermediate channel consists of a same logical channel and a same transport channel.

8. The network device according to claim 6, wherein the one or more hardware processors execute the instructions to:
perform, at the first protocol layer, encapsulation processing on the first information, to generate a first message;

perform, at the first protocol layer, encapsulation processing on the second information, to generate a second message; and
map the first message and the second message to an intermediate channel between the first protocol layer and the physical layer and sending the first message and the second message to the physical layer, wherein
the intermediate channel includes a same logical channel and a same transport channel, or the intermediate channel consists of different logical channels and a same transport channel.

9. The network device according to claim 6, wherein the one or more hardware processors execute the instructions to:
perform, at the first protocol layer, encapsulation processing on the first information, to generate a first message;
perform, at the first protocol layer, encapsulation processing on the second information, to generate a second message;
map the first message to a first intermediate channel between the first protocol layer and the physical layer and send the first message to the physical layer; and
map the second message to a second intermediate channel between the first protocol layer and the physical layer and send the second message to the physical layer.

10. The network device according to claim 9, wherein the one or more hardware processors execute the instructions to:
perform, at the physical layer, physical layer processing on the first message received by using the first intermediate channel and the second message received by using the second intermediate channel, wherein the first message and the second message are used as a whole.

11. The network device according to claim 9, wherein the one or more hardware processors execute the instructions to:
perform, at the physical layer, physical layer processing on each of the first message received by using the first intermediate channel and the second message received by using the second intermediate channel.

12. The network device according to claim 9, wherein the first intermediate channel comprises at least one of a first logical channel or a first transport channel, and the second intermediate channel comprises at least one of a second logical channel or a second transport channel.

13. The network device according to claim 6, wherein the second information comprises:
a first time index (TI) of a first SSB in an SS burst set to which the first SSB belongs; or
a combination of a second TI of a first SSB in an SS burst to which the first SSB belongs and a third TI of the SS burst in an SS burst set to which the SS burst belongs.

14. A terminal device, comprising:
a transceiver that is configured to receive, on a physical broadcast channel (PBCH), data sent by a network device;
a non-transitory memory storage comprising instructions; and
one or more hardware processors in communication with the non-transitory memory storage, wherein the one or more hardware processors execute the instructions to:
perform physical layer processing on the received data at a physical layer, wherein
transmit, from the physical layer to a first protocol layer, the data on which the physical layer processing has been performed; and
process, at the first protocol layer, the data on which the physical layer processing has been performed, to obtain first information and second information, wherein the first information comprises system information, and the second information is used to determine a time-frequency resource corresponding to one or more synchronization signal blocks (SSBs) that carry the data.

15. The terminal device according to claim 14, wherein the one or more hardware processors execute the instructions to:
map, to an intermediate channel between the first protocol layer and the physical layer, the data on which the physical layer processing has been performed, and send the data to the first protocol layer; and
perform, at the first protocol layer, decapsulation processing on the data received by using the intermediate channel, to obtain an entirety formed by combining the first information and the second information, and obtain the first information and the second information from the entirety formed by combining the first information and the second information, wherein
the intermediate channel includes a same logical channel and a same transport channel.

16. The terminal device according to claim 14, wherein the one or more hardware processors execute the instructions to:
map, to an intermediate channel between the first protocol layer and the physical layer, the data on which the physical layer processing has been performed, and send the data to the first protocol layer; and
perform, at the first protocol layer, decapsulation processing on the data received by using the intermediate channel, to obtain the first information and the second information, wherein
the intermediate channel comprises a same logical channel and a same transport channel, or the intermediate channel comprises different logical channels and a same transport channel.

17. The terminal device according to claim 14, wherein the one or more hardware processors execute the instructions to:
perform physical layer processing on the received data at the physical layer, to obtain first data and second data on which the physical layer processing has been performed;
map, to a first intermediate channel between the first protocol layer and the physical layer, the first data on which the physical layer processing has been performed, and send the first data to the first protocol layer;
map, to a second intermediate channel between the first protocol layer and the physical layer, the second data on which the physical layer processing has been performed, and send the second data to the first protocol layer;
perform, at the first protocol layer, decapsulation processing on the first data received by using the first intermediate channel, to obtain the first information; and
perform, at the first protocol layer, decapsulation processing on the second data received by using the second intermediate channel, to obtain the second information.

18. The terminal device according to claim 17, wherein the first intermediate channel comprises at least one of a first logical channel or a first transport channel, and the second intermediate channel comprises at least one of a second logical channel or a second transport channel.

19. The terminal device according to claim 14, wherein the data received by the transceiver comprises first data and second data; and
the one or more hardware processors execute the instructions to:

perform physical layer processing on the received first data at the physical layer, to obtain the first data on which the physical layer processing has been performed;

perform physical layer processing on the received second data at the physical layer, to obtain the second data on which the physical layer processing has been performed;

map, to a first intermediate channel between the first protocol layer and the physical layer, the first data on which the physical layer processing has been performed, and send the first data to the first protocol layer;

map, to a second intermediate channel between the first protocol layer and the physical layer, the second data on which the physical layer processing has been performed, and send the second data to the first protocol layer;

perform, at the first protocol layer, decapsulation processing on the first data received by using the first intermediate channel, to obtain the first information; and perform, at the first protocol layer, decapsulation processing on the second data received by using the second intermediate channel, to obtain the second information.

20. The terminal device according to claim 14, wherein the second information comprises:

a first time index (TI) of a first SSB in an SS burst set to which the first SSB belongs; or a combination of a second TI of the first SSB in an SS burst to which the first SSB belongs and a third TI of the SS burst in an SS burst set to which the SS burst belongs.

* * * * *